United States Patent [19]

Wolfberg et al.

[11] Patent Number: 5,214,579

[45] Date of Patent: May 25, 1993

[54] GOAL-ORIENTED INVESTMENT INDEXING, TRACKING AND MONITORING DATA PROCESSING SYSTEM

[75] Inventors: Larry Wolfberg, Honolulu, Hi.; Jan E. Rhoads, Virginia Beach, Va.; Brent A. Wolfberg, Los Angeles, Calif.

[73] Assignee: L & C Family Partnership, Century City, Calif.

[21] Appl. No.: 456,638

[22] Filed: Dec. 22, 1989

[51] Int. Cl.$^5$ .................. G06F 15/21; G06F 15/30
[52] U.S. Cl. ........................... 364/408; 364/401
[58] Field of Search ................... 364/408, 405, 401

[56] References Cited

U.S. PATENT DOCUMENTS

| | | | |
|---|---|---|---|
| 3,697,693 | 10/1972 | Deschenes et al. | 364/408 X |
| 4,376,978 | 3/1983 | Musmanno | 364/408 |
| 4,594,663 | 6/1986 | Nagata et al. | 364/408 |
| 4,597,046 | 6/1986 | Musmanno et al. | 364/900 |
| 4,642,768 | 2/1987 | Roberts et al. | 364/408 |
| 4,648,037 | 3/1987 | Valentino | 364/408 |
| 4,694,397 | 9/1987 | Grant et al. | 364/408 |
| 4,742,457 | 5/1988 | Leon et al. | 364/408 |
| 4,750,119 | 6/1988 | Cohen et al. | 364/401 |
| 4,752,877 | 6/1988 | Roberts et al. | 364/408 |
| 4,774,663 | 9/1988 | Musmanno et al. | 364/408 |
| 4,774,664 | 9/1988 | Campbell et al. | 364/408 |
| 4,885,685 | 12/1989 | Wolfberg et al. | 364/408 |
| 4,910,676 | 3/1990 | Allredge | 364/408 |
| 4,933,842 | 6/1990 | Durbin et al. | 364/408 |
| 4,941,090 | 7/1990 | McCarthy | 364/405 |
| 4,994,964 | 2/1991 | Wolfberg et al. | 364/408 |

Primary Examiner—Roy N. Envall, Jr.
Assistant Examiner—Xuong Chung
Attorney, Agent, or Firm—Nixon & Vanderhye

[57] ABSTRACT

A data processing system is disclosed which manages, monitors and reports the growth of a participant's investment base with respect to progress towards achieving a predetermined target amount selected by the participant. Additionally, the data processing system monitors and controls a wide variety of financial services which are provided to the participant such as check writing and borrowing privileges as well as insurance benefits. The growth of a participant's initial as may be supplemented by monthly investments is tracked and interpreted based on criteria and projections which are periodically made and which reflect how well the account is progressing towards achieving the target amount. In this regard, the time frame that it will take for the account to reach the target amount at the current account growth rate is projected at periodic intervals, e.g., monthly. The impact on such a time frame of accentuated payments, e.g., increased monthly payments or modified cycle payments (i.e., payments made at intervals of greater than once a month), is also reported to participants. The data processing system is programmed to track actual growth realized by the account against a predetermined guaranteed minimum rate return on a participants' investment base.

48 Claims, 28 Drawing Sheets

FIG. 9A CLIENT ACCOUNT FORMAT

- (REPORT) TITLE/DATE/PERIOD COVERED (CURRENT MONTH)
- (CLIENT) ACCOUNT#/ID#/NAME/ADDRESS/LAST CLIENT ACTIVITY
- (STATUS) ACCOUNT/PAYMENT/LOAN/INVEST/CREDIT/SPLIT/DEFICIT
  (CURRENT CSW'S)
- (PARAMETERS) DEPOSIT $X_0$/MONTHLY PAYMENT $Y_0$/NUMBER OF YEARS $N_0$/TARGET AMOUNT $M_0$
  (CURRENT/ORIGINAL)
- (DATES) START DATE(SD) / REDATE (IF ANY) / TARGET DATE(TD=SD+$N_0$) / PROJECTED DATE (IF DIFFERENT FROM TD
  (CURRENT/ORIGINAL) (INITIAL MONTH/YEAR) (FROM LOAN/INVESTMENT/DEFICIT) (BASED ON GR=8%) (BASED ON GR>8% OR PAYMENTS>$Y_0$)
- (RATES) GROWTH RATE(GR)% / YEAR-TO-DATE GR LIMITS / INTEREST RATE(INT)% / YEAR-TO-DATE INT LIMITS
  (CURRENT/LAST) (FROM HIGH-YIELD INVESTMENTS) (YTD MIN/MAX%)

ACCOUNT SUMMARY

CLIENT ACCOUNT

| (BALANCE) | (PAYMENT) | (CREDIT) | (INVEST) | (LOAN) |
|---|---|---|---|---|
| BALANCE/ B9/8% | $P_{REQUIRED}$/ $P_{RECEIVED}$ | $C_{LIMIT}$/ $C_{AVAIL}$ | $I_{LIMIT}$/ $I_{AVAIL}$ | $L_{LIMIT}$/ $L_{AVAIL}$ |

COMPANY ACCOUNT

| (PROFIT) | (SPLIT) | (DEFICIT) | (OPERATE) |
|---|---|---|---|
| PROFIT/ PROJECTED | $S_{LIMIT}$/ $S_{AVAIL}$ | $D_{PENDING}$/ $D_{PAID}$ | $O_{PENDING}$/ $O_{PAID}$ |

MONTHLY TRANSACTIONS

| GROWTH DELTAS (Δ) | Δ $C_{AVAIL}$ | Δ $I_{AVAIL}$ | Δ $L_{AVAIL}$ | Δ S AVAIL |
|---|---|---|---|---|
| (CURRENT-LAST MONTH) | | | | |

TO FIG. 9B

FROM FIG. 9A

| | CLIENT DEPOSITS ($X_0, X_1$, ETC.) | CHECKS/ CREDITCARD (PROCESSED BY BANK) | | | | COMPANY DEPOSITS (OUTSIDE SOURCES) | | |
|---|---|---|---|---|---|---|---|---|
| DEPOSITS/ WITHDRAWALS | | | | | | | | |
| PAYMENTS REQUIRED | MONTHLY ($P_{REQ} = Y_0$) | N/A (NONE REQUIRED) | CYCLE ($I_{REQ} = I_{INVEST}/24$) | REPAY ($I_{REQ} = LOAN/12$) | | N/A (NONE REQUIRED) | OFFSET ($D_{REQ} = $ CUM DEFICITS PENDING) | COSTS ($O_{REQ} = $ CUM COST PENDING) |
| RECEIVED | $P_{RECD}$ | $C_{ACCENT}$ ($C_{ACCENT} = P_{RECD} - P_{REQ}$) | $I_{CYCLE}$ (INCLUDING DIVIDENDS) | $L_{REPAY}$ | | | $D_{OFFSET}$ ($D_{OFFSET} = D_{PEND} - S_{AVAIL}$) | $O_{COSTS}$ ($O_{OPERATE} = O_{PEND} - S_{AVAIL}$) |
| DEFAULT (IF ANY) (DEDUCTED FROM $C_{AVAIL}$ FUNDS) | $P_{DEFAULT}$ | N/A (SEE BELOW) | $I_{DEFAULT}$ | $L_{DEFAULT}$ | | | $D_{DEFAULT}$ (ONLY IF $S_{AVAIL}=\emptyset$) | $O_{DEFAULT}$ (ONLY IF $S_{AVAIL}=\emptyset$) |
| DEBITS (IF ANY) | | ALL DEFAULT PAYMENTS DEDUCTED FROM $C_{AVAIL}$ THEN FROM $I_{AVAIL}$ AND THEN FROM $L_{AVAIL}$ | INVESTMENT (REQUESTED BY CLIENT) | LOAN (REQUESTED BY CLIENT) | | | N/A (SEE BELOW) | ALL COSTS/ DEFICIT (DEDUCTED FROM $S_{AVAIL}$) |
| PROJECTIONS (TRIAL $M_0$ PROJECTED FROM CURRENT BALANCE) | TRIAL DEPOSIT INCREMENT $X_1$ (DEFAULTS TO $10K) | TRIAL PAYMENT INCREMENT $Y_1$ (DEFAULTS TO $100/MONTH) | REDUCED NUMBER OF YEARS $N_1$ (BASED ON REACHING $M_0$ AT CURRENT GR%) | INCREASED TARGET AMOUNT $M_1$ (BASED ON CURRENT GR% OVER $N_0$ YEARS) | | | | |

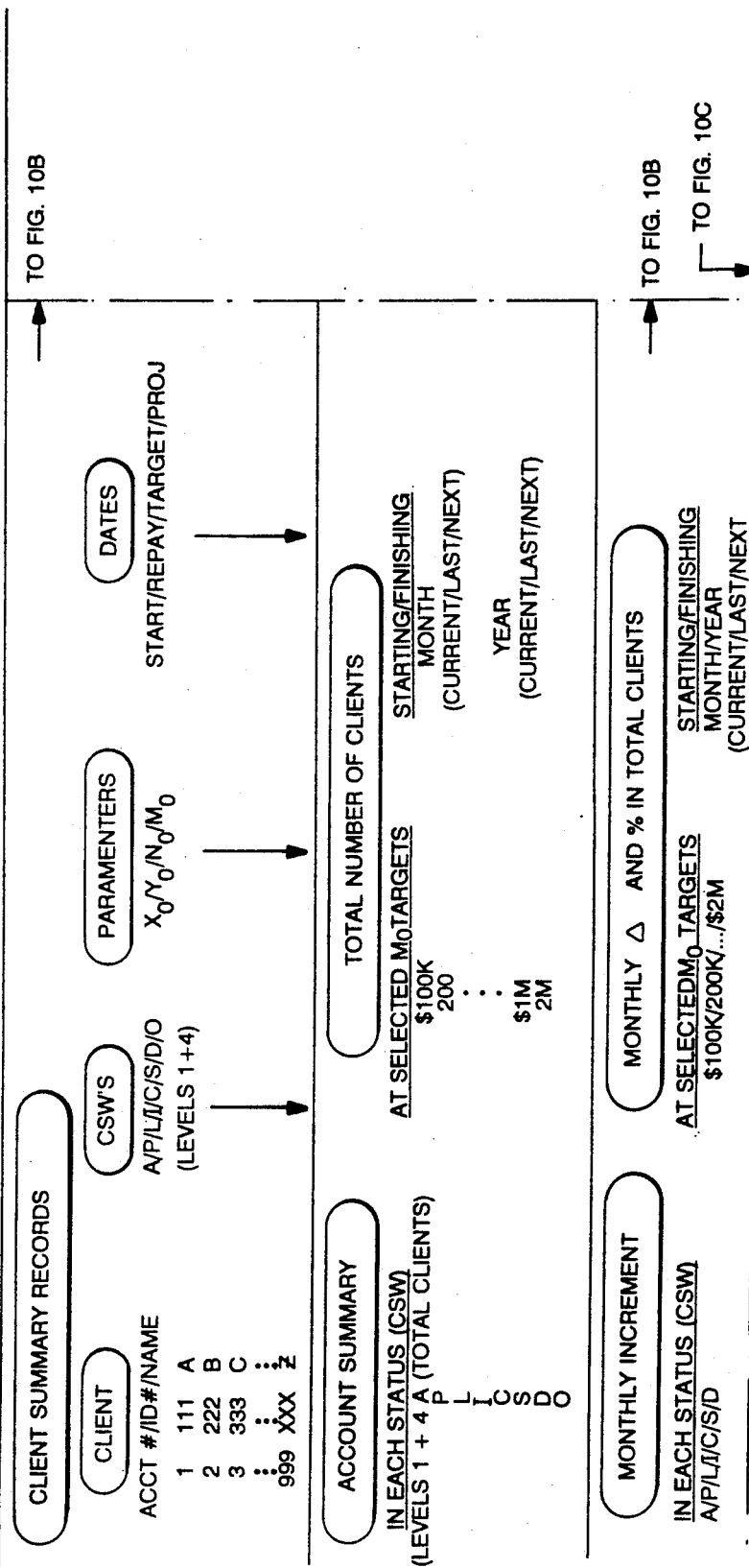
FIG. 10A INVESTMENT ACCOUNT FORMAT

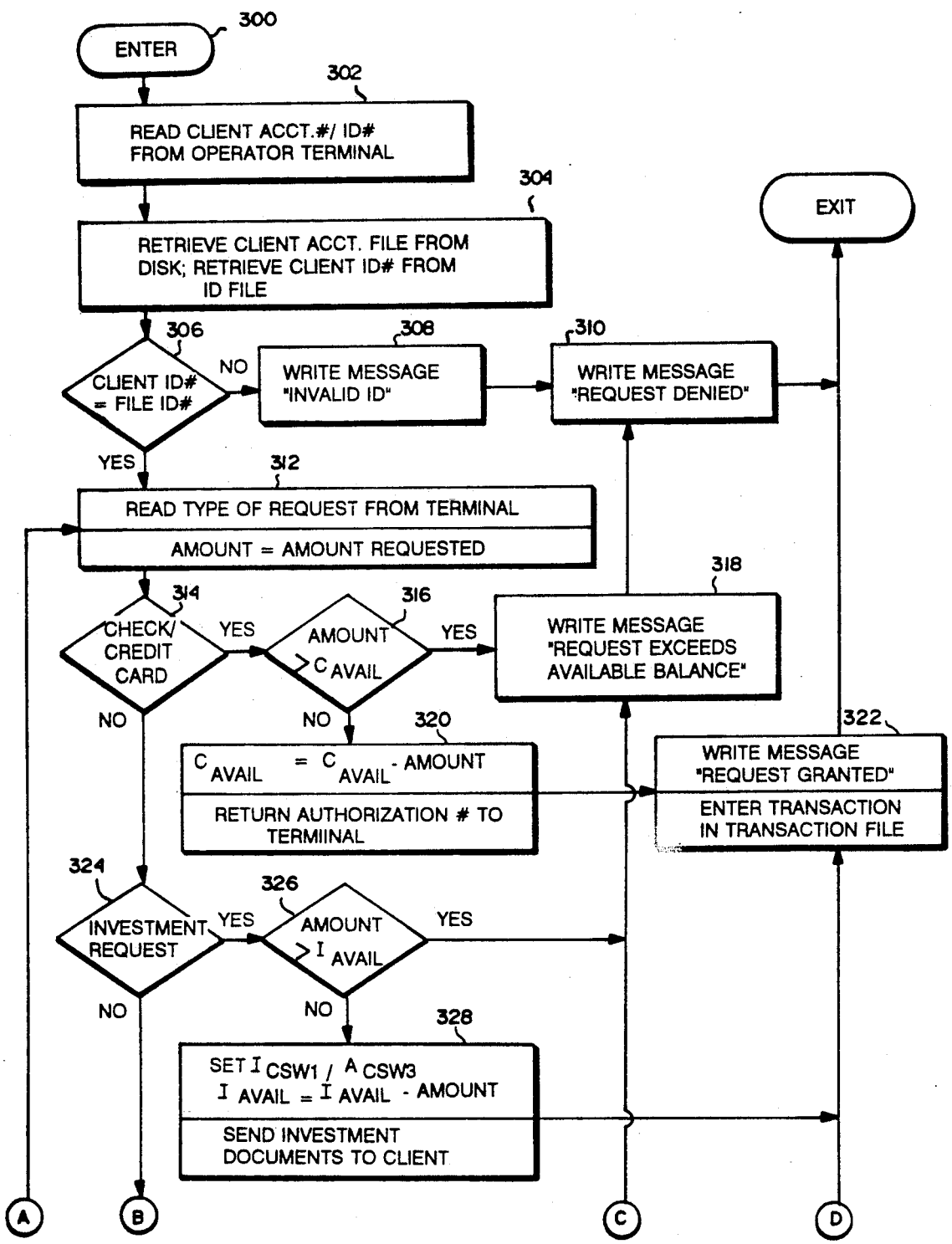
FIG. 11A  PROCESS SERVICE REQUESTS

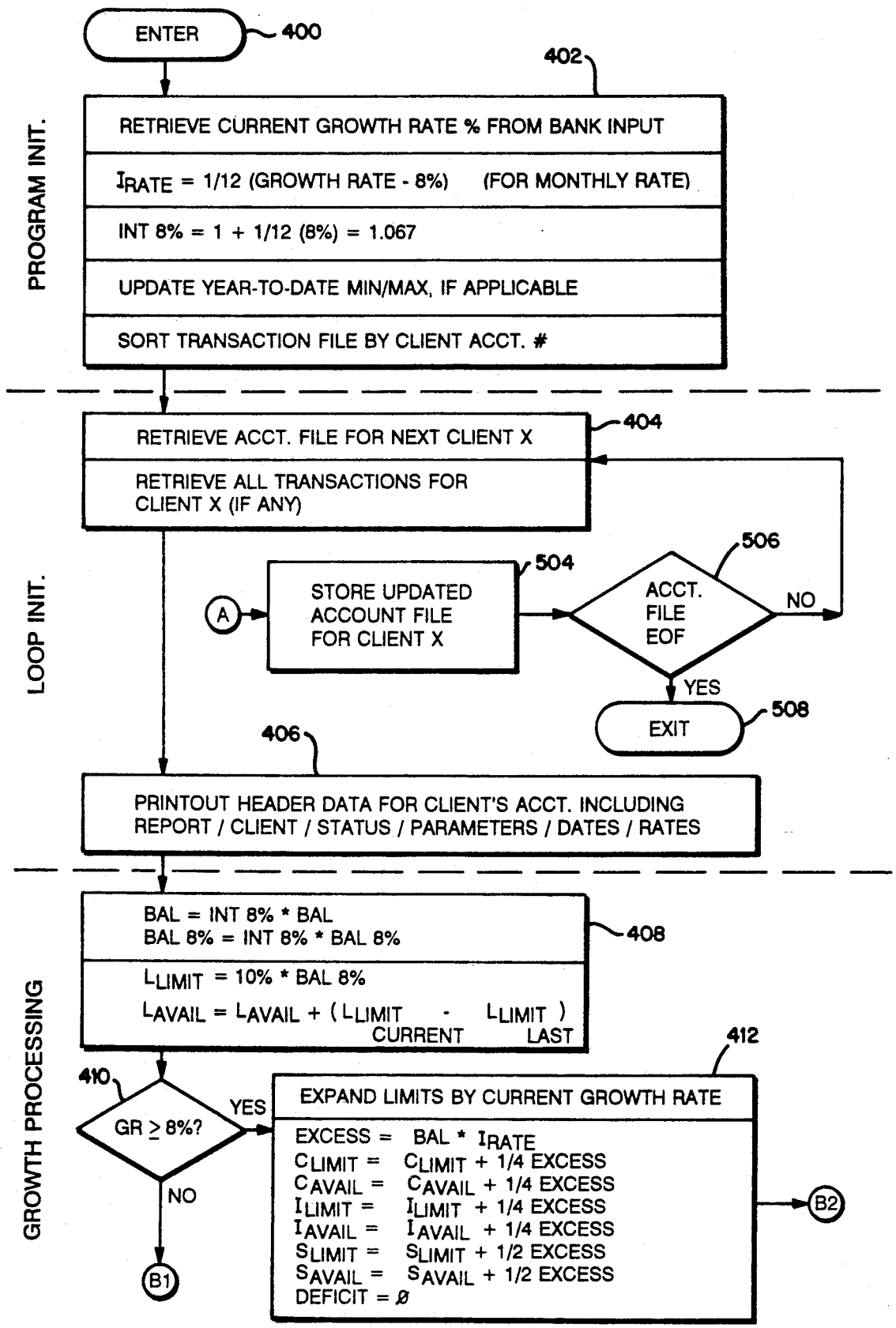
FIG. 12A UPDATE CLIENT FILES

GOAL-ORIENTED INVESTMENT INDEXING, TRACKING AND MONITORING DATA PROCESSING SYSTEM

FIELD OF THE INVENTION

The invention generally relates to an improved data processing method and apparatus for financial service task management. More particularly, the invention relates to a data processing system which manages, monitors, and reports the growth of a participant's investment base with respect to progress towards achieving a predetermined target amount.

BACKGROUND AND SUMMARY OF THE INVENTION

Due to a failure to participate in any meaningful savings program or due to bad investments or unforeseen financial burdens, etc., the vast majority of people in this country have been unable to achieve financial security for either themselves or their families. Accordingly, the vast majority of retired people in this country are unfortunately in a position where they have to exist on a retirement income that is not very far from the poverty level. Many of these individuals may have received a more than respectable annual salary for most of their working lives. The present data processing method and apparatus uniquely contributes to the accumulation of funds towards a predetermined objective or goal with built in assurances for accomplishing the objective.

In order to be successful in efficiently achieving a desired end, it is critical to have well defined goals. For best results, careful monitoring of the progress towards achieving the goals is highly desirable. While there are many sophisticated prior art financial management data processing systems, such systems are typically utilized to monitor the investments selected by a client and/or an advising broker without regard to any predefined goal. For example, the security brokerage/cash management system described in U.S. Pat. No. 4,326,442, discloses a data processing system for monitoring and controlling a wide range of investments without regard to an initial investment base achieving any predefined goal.

The data processing system of the present invention manages, monitors and reports the growth of a participant's investment base with respect to progress towards achieving a predetermined investment target or goal amount. Additionally, the data processing method and apparatus of an exemplary embodiment of the present invention, monitors and controls a wide variety of financial services which are provided to the participant such as check writing and borrowing privileges as well as insurance benefits.

The growth of a participant's initial investment base as may be supplemented by monthly investments is tracked and interpreted based on criteria and projections periodically made which reflect how well the account is progressing towards achieving the target amount. In this regard, the time frame that it will take for the account to reach the target amount at the current account growth rate is projected at periodic intervals, e.g., monthly. The impact on such a time frame of accentuated payments, e.g., increased monthly payments or modified cycle payments (i.e., payments made at intervals of greater than once a month), is also reported to participants. As will be exemplified below, the present system segregates the growing investment base into a plurality of separate funds which are each monitored. The process of using maturing investments over time incorporating these features as described in this application is referred to as investment indexing.

In an exemplary embodiment of the present invention, the data processing system is programmed to -track a predetermined guaranteed minimum rate return on a participants' investment base. While this predetermined minimum guaranteed rate of return may be any reasonable rate of return (e.g., 4%, 6%, 8% or more), in the detailed description which follows the guaranteed rate of return for purposes of example only is 8%.

In an exemplary embodiment, this minimum rate of return is guaranteed by the company managing all the participant investments. The managing company receives from an individual participant a predetermined initial investment base, and typically a commitment by the investor to make a predetermined monthly investment. At the outset, the client also selects a fixed target amount that the system utilizes as its target goal (e.g., $100,000, $500,000, $1,000,000 dollars). Alternatively, the target amount may be based on a fixed percentage of the initial investment (e.g., 50%). The data processing system of the present invention tracks the growth of the initial investment base as well as the accumulated monthly payment base and periodically determines the time frame required to reach a participant's selected target goal based on current performance per projected or programmed guidelines. The funds may, for example, be invested in a tax deferred vehicle such as insurance or tax exempt securities.

As noted above, the company controlling participant investments guarantees a predetermined rate of return on investments, e.g., 8% compounded monthly. If the prevailing rate of return is not sufficient to sustain growth of the accounts at the predetermined rate, the system tracks the amount of funds required to be supplied by the managing company to place the investment base growth rate back on the guaranteed minimum return rate.

If the achieved investment rate of return from the managing company's controlled investment yields a higher rate of return than the minimum guaranteed rate, the excess amount over and above the minimum return may, for example, be split or otherwise allocated between the managing company and the participating client after predetermined operating costs are deducted or may be distributed in any other desirable manner. The present system monitors the growth of the investment by segregating the growing investment base into a plurality of separate funds. As opposed to maintaining separate funds based on growth in excess of a predetermined minimum rate of return 8%, the present invention alternatively contemplates segregating a predetermined percentage of the original investment (such as 15% of the total investment) to achieve a predetermined return, for example, 50% of the total funds committed. For further details in this regard, see U.S. Pat. Nos. 4,994,964 and 4,885,685 are hereby expressly incorporated by reference herein. For example, U.S. Pat. No. 4,885,685 describes how a first fund comprising, for example, 85% of an initial investment base is utilized to support a predetermined investor activity, and 15% of the investment base is utilized to achieve a predetermined target investment goal. Similarly, in the present application, a first account fund (e.g., 85% of an initial investment base) may be used for user controlled investments/expenditures and a second account fund (e.g., 15% of the initial investment base) may be used to achieve a guaranteed target amount, such as 50% of the total funds committed. The second account may be treated as a special account with check writing privileges which is monitored and controlled to achieve the guaranteed return, for example, in the manner described in U.S. Pat. No. 4,885,685 or in the manner described in detail herein. The managing company may typically reserve a significant portion of its profits due to participant investment performance to cover future deficits.

The participant may be offered check writing and borrowing privileges based on a separate account which may be funded based on a predetermined percentage of the initial investment (and which returns funds to the initial investment account) or on a predetermined percentage of accumulated funds which are in excess above the minimum guaranteed rate of return. It is noted that a predetermined percentage of the participants excess funds above the minimum rate of return are reserved for covering deficits below the minimum rate of return (i.e., if the deficit is so significant that the companies portion of split excess funds over the 8% minimum rate of return is exhausted).

By way of example only, in order to prevent a participant from self-destructive investments which would preclude achievement of the target goal in the desired time frame, the participant is only permitted to choose his or her own investments using a predetermined percentage of the funds which have accumulated as an excess above the 8% or any predetermined target growth level. The return yielded by the participant's self-directed investments may be used to repay the original investment amount deducted from the account.

The system also monitors the amount of funds which the participant is allowed to borrow at any predetermined time. The amount which may be borrowed may, for example, be a predetermined percentage of the funds that have accumulated based upon the 8% minimum guaranteed rate of return. As with any loan, the amount borrowed is expected to be repaid in scheduled monthly installments. Such is, by way of example only, repayment demanded by the system in order to keep the participant's account on track to the target goal.

The participant has essentially complete flexibility as to selecting an initial investment amount, the amount of the monthly payments and the desired target investment goal. As noted above, if desired, the initial investment amount may be based on, for example, 85% of the total investment funding which may be used for user controlled investment expenditures and the remaining 15% of the total funding may be segregated to achieve the predetermined target goal (e.g., 50% of the initial investment funding). The managing company then uses the data processing system of the present invention to project the amount of time that it will take for the account to achieve the target goal based on a predetermined minimum rate of return, (e.g., 8%). As time progresses, the data processing system is used to project the reduced amount of time to achieve the target goal in view of the higher return on investment actually realized (e.g., 12%).

The data processing system of the present invention is utilized to periodically process the data relating to the current monthly payments, initial investment base, and prevailing rate of return on investments to project how much more time will be required to reach the participant's target investment amount. At the same time, the data processing method and apparatus of the present invention keeps track of the parameters which govern a participant's check writing, borrowing and insurance benefits which flow from his current investment base. Periodic reports reflecting such investment base growth, target projections and financial services related information are generated, for example, on a monthly basis, for both the participant's use and the managing company's use.

BRIEF DESCRIPTION OF THE DRAWINGS

These as well as other features of this invention will be better appreciated by reading the following detailed description of an exemplary embodiment taken in conjunction with the accompanying drawings of which:

FIGS. 9A–9C are representations of an exemplary client account format and its associated transaction file format, respectively;

FIGS. 10A–10C are a representation of an exemplary investment file format;

FIGS. 11A–11B are a flowchart delineating the sequence of operations performed by the process service requests routine.

FIGS. 12A–12E are flowcharts delineating the sequence of operations performed by the update client file routine;

DETAILED DESCRIPTION OF THE DRAWINGS

Figure 1:
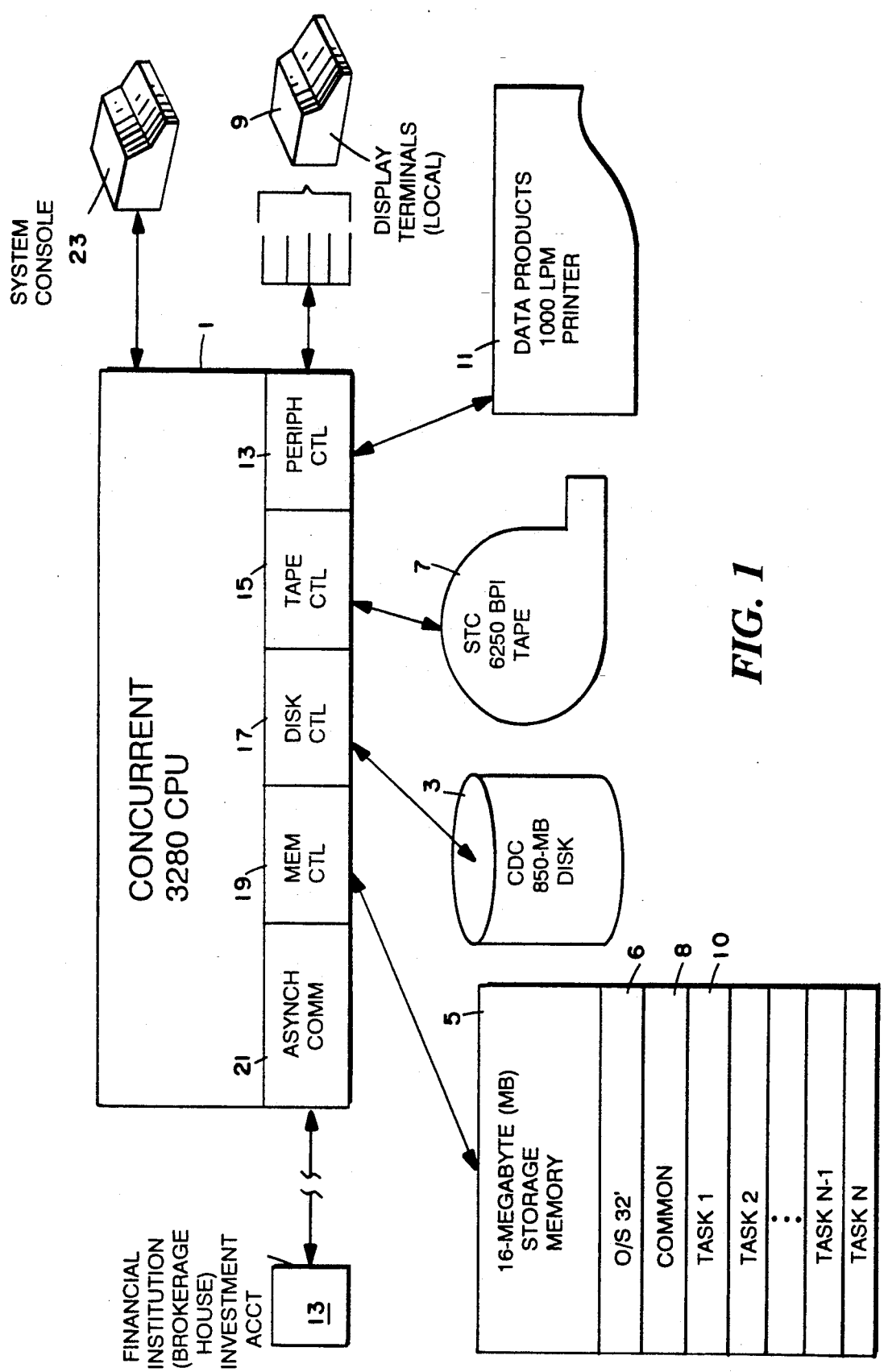
FIG. 1 is schematic diagram of an exemplary embodiment the hardware elements in the data processing system of the present invention.

Before turning to a detailed description of the hardware and software elements of the present invention, it is helpful to initially focus on the definition of terminology and symbology which will be used throughout the specification. An "initial investment" ($X_O$) is the initial amount of money which a client chooses to initially invest. The "monthly payment" ($Y_O$) is the amount of money which the client may agree to invest on a monthly basis. The initial investment $X_O$ and monthly payment $Y_O$ may be any predetermined amount selected by the client. The monthly payment must otherwise be calculated by the system in view of the client's desired target goal (M dollars) and timeframe (N years).

As will be described in detail below, the data processing system of the present invention, independently tracks the growth of the initial investment fund as well as the fund accumulated due to monthly payments since these two funds may grow at different rates. In this regard, the monthly payment fund may grow at a different rate than the initial investment fund since the monthly payments may vary. The participants total investment base (Z) is the sum of the initial investment base accumulations plus the accumulated monthly payments. The total amount of funds in a client's account at any month i, where i may vary from 1 to 12, is the sum of the initial investment accumulated funds at month i ($X_i$) plus the accumulated monthly payment funds at month i ($Y_i$).

The "target amount", or "target goal" M, is the ultimate amount of money targeted by the client that he desires to reach. The "target date" is the date projected by the system at which the participant will achieve the target amount based on the initial investment $X_O$, the monthly payment $Y_O$ and the guaranteed minimum interest rate I (e.g., 8%). The "time frame" N is the amount of time from the start date that will be required to achieve the target amount (to the nearest month).

The "growth line" (or growth floor) is the guaranteed minimum rate of return on a participant's investment by the controlling company (e.g., the accumulating account balance based on 8% growth rate). If the prevailing rate of return on investments is below this growth floor, the investing company is responsible for making up whatever deficit is required to put the account growth back on track and in line with the growth line. By way of example, in the present specification, the growth line is 8% compounded monthly.

The "excess funds" is the amount of money at any given point in time in a participant's account that is in excess of the 8% growth line paid by the company. For example, if an account has grown at a rate of 12%, the "excess funds" is the difference between the current amount in the account accumulated at 12% and the amount of money which would have been in the account if the account had grown in accordance with the minimum guaranteed rate of return of 8%.

The "split zone" refers to all the excess funds in the account which are split between the participant and the investment controlling company (e.g., 50/50 split). The funds in the split zone are separately monitored by the system. A "make-up" payment is a payment which is subtracted from the client's portion of the split zone to make up for a monthly payment which was not made.

"Check writing" is a client service provided through an investment bank and monitored by the system, but may be limited to one half of the client's portion of the split zone. The investment bank is informed by the controlling company each month as to the amount of funds that the client is permitted to write checks against.

A "client investment" is an investment which is funded by up to one half of the funds in the client's portion of the split zone, which may be utilized by the client to make investments he chooses. These investments are processed by the controlling company and monitored by the company so that initial profits resulting from such an investment are utilized to replenish the funds taken from the split zone prior to any further distributions to the client.

A "client loan" is the amount of funds which may be borrowed by a participant at any time, but which is limited to, for example, ten percent of the funds which have accumulated based on a 8% rate of return (i.e., at the growth line). Alternatively, borrowing may be restricted to funds outside of the investment account using investment account funds as collateral.

The "company deficit" is the amount of funds for which the controlling company is responsible (i.e, a growth rate below the minimum rate) in order to put a participant's account back on track to attain the minimum guaranteed rate of return. In order to make up the loss to restore a participant's account to the growth line for any given month, the deficit is initially funded by the amount of funds in the company's split zone. By way of example only, if these funds should become exhausted, the company deficit may be funded by the funds from the client's portion of the split zone.

An "accent payment" is an increased payment, over and above the agreed-upon monthly payment, to increase the investment base or to pay off any existing loans. A "cycle payment" is a increased number of payments interleaved with regularly scheduled monthly payments. Through either the use of accentuated payments or cycle payments, a participant may catch up on missed payments on a current schedule, or accelerate the current schedule to shorten the time frame to reach his target amount. Alternatively, such payments may be used to increase his target amount while staying on the original time frame formulated upon entry into the program.

The "recovery period" is the length of time that it will take to restore an account to its undisturbed value prior to a client loan, a client investment, or a company deficit. The "restore date" is the date at which the account will be restored at the end of the recovery period. The "operating costs" are the costs which are deducted from an account prior to the company/client split.

Finally, it is noted that each participant account may have an insurance value associated with it. For example, the participant's initial investment may be utilized as a single premium insurance purchase.

Turning now to the drawings, as shown in FIG. 1, the heart of the data processing hardware elements of an exemplary embodiment of the present invention is the Concurrent (formerly Perkin-Elmer) 3280 Central Processing Unit 1 (CPU). The 3280 CPU is extremely fast and efficient and is powerful enough to process a large volume of account data while handling nearly simultaneous inquiries regarding individual participant accounts processing at a number of terminals. In this regard, the CPU processes on the order of 6 million instructions per second (MIPS), and is therefore fully capable of handling a large volume of investment processing tasks with an extremely fast response time.

The CPU 1 creates the client investment account related data files (as will be explained further below) and stores such data files on disk 3, which may, for example, be a CDC850 megabyte (MB) disk manufactured by Control Data Corporation. Many of the programs controlling the CPU are likewise stored on disc 3. These programs are selectively retrieved and executed to accomplish the financial management tasks of the present invention on both an offline periodic basis and an online demand basis.

In the FIG. 1 embodiment, CPU 1 receives financial account status inquiries and account transactions from individual clients or the investment managing company.

Account status inquiries may be made by the client via an 800 phone number service. These client processing requests are entered into the system via display terminals 9, which may, for example, be Lear Siegler ADM-11 keyboard/display terminals. Each input request regarding a given account is processed as one of N separate tasks (1, 2, ..., N−1, N) by the CPU 1 after being stored in a first-in first-out (FIFO) stack resident in 16-MB storage memory 5 in, for example, a storage area designated as 10 in FIG. 1. Also resident in memory 5 is the operating system 6 for the 3280 CPU, commonly designated as O/S 32. O/S 32 provides a multi-tasking environment in which all investment-related tasks (1, 2, ..., N) communicate through a shared "global" common memory area.

By way of example only, information required for all the task processing, such as the prevailing investment rate of return to be used for monitoring investment growth, is stored in the common memory area 8 where it is used in processing, for example, each of the client account status inquiry requests as will be explained further below. Each of the client account files is also processed on a periodic basis, e.g., monthly, so that the account data may be analyzed and updated by the CPU 1. Such updating is conducted in response to, for example, the prevailing rate of return and the account activity (i.e., check writing, loans, etc.) from the financial institution 13 managing the company's investment accounts.

Memory 5 is utilized by CPU 1 via memory controller 19 for loading and executing programs relating to client file updating, client account status inquiry processing, saving updated "global" data back on disc 3, etc. In view of the 32 address bits available in the 3280 CPU, virtually unlimited expansion of memory 5 is contemplated by the present system. Additionally, as will be appreciated by those skilled in the art, additional disc drives can be utilized by CPU 1 via the disc controller 17, should the data files exceed 850 MB. The tape unit 7, which may be an STC 6250 bits-per-inch (BPI) drive, serves as a back-up memory under the control of CPU 1 via tape controller 15 and is used to preserve the disc contents as archival data and/or in case of a power failure, disc head crash, or other system catastrophe.

The system also includes a printer 11. The CPU 1 interfaces with display terminals 9 and printer 11 via a conventional peripheral controller 13. The printer 11 may, for example, be a Data Products 1000 lines-per-minute (LPM) printer for producing, e.g., periodic monthly statements, hard copies of individual status requests, etc.

The data processing system of the present invention further communicates with a financial institution 13, which may be a bank, a brokerage house, or the like. A computer in financial institution 13 receives, for example, information from CPU 1 regarding the amount available in the client account for check writing, and new account information. In return, it transmits to CPU 1 prevailing rate of return indicia, including the amount of interest credited to the high-yield investment fund, and the amounts written on client's individual checking accounts.

Figure 2:
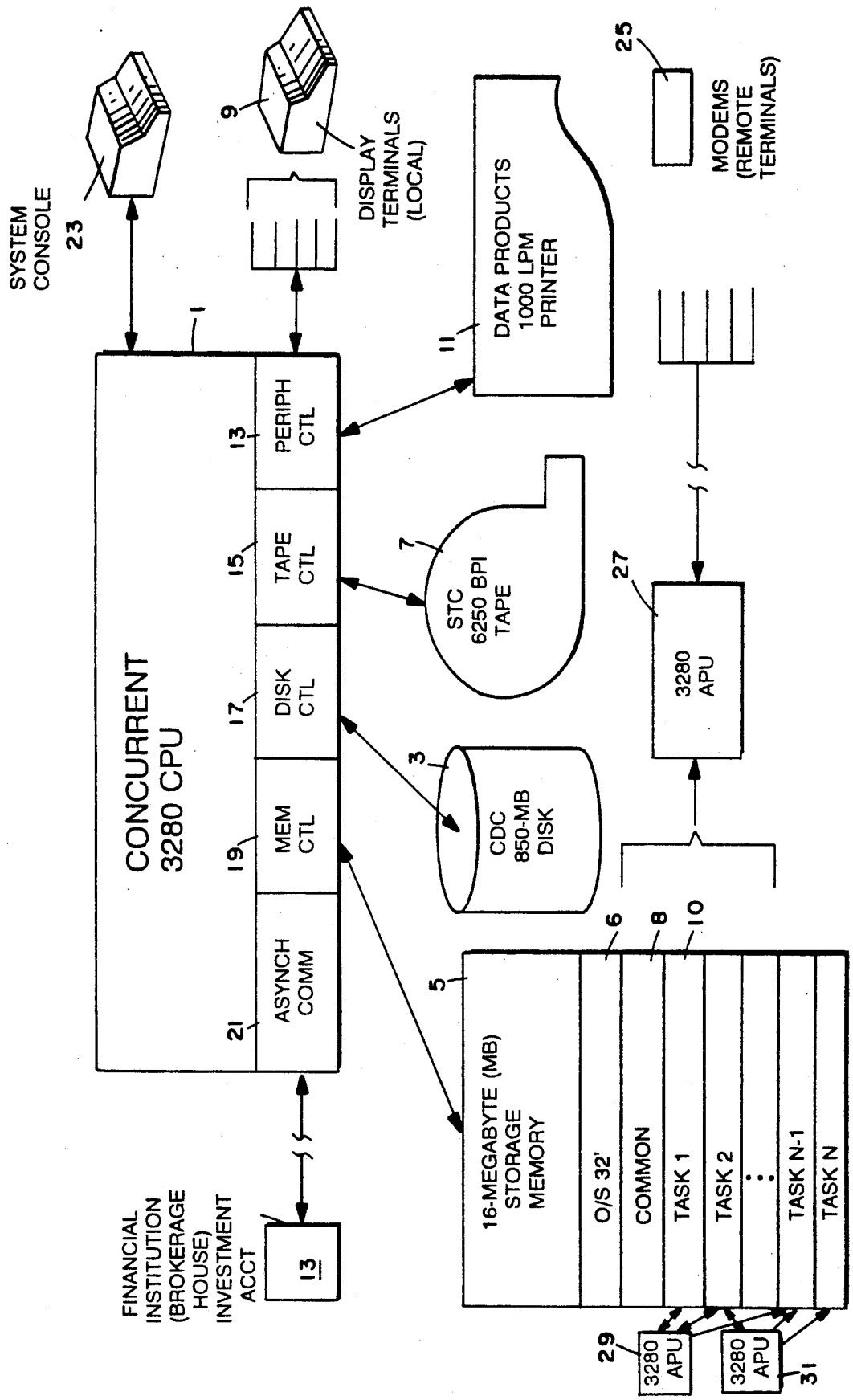
FIG. 2 is a schematic diagram of an alternative embodiment of hardware elements in the data processing system of the present invention.

FIG. 2 shows an alternative embodiment of the present invention wherein all of the customer accounts may be accessed remotely via modems 25. System components which operate identically, as described above, will not be discussed with respect to FIG. 1. By utilizing a remote terminal (not shown) similar to display terminals 9 via a modem 25, an affiliated investment company or an individual account holder, can directly input, for example, an account status inquiry request by keying in a customer name, account number, etc., and can directly receive a response without the need for an 800 number. Such a response may, for example, enable an associated, remotely-located investment company manager to immediately approve a loan to a participating client.

In the system shown in FIG. 2, the CPU 1 operates as the executive controller that assigns tasks to a bank of slave auxiliary processor units (APU) 27, 29 and 31. Each APU is identical in structure to the 3280 CPU so that it includes, for example, the same peripheral tape, disc, and memory controllers shown with CPU 1, as well as it own asynchronous communication interface 21. APU 27 is dedicated to handling the relatively slow input-output communications between the tasks (1, 2, ..., N) and the modems linked to associated remote terminals.

In the FIG. 2 embodiment, CPU 1, for example, monitors a job queue in memory 5 and assign tasks to a particular APU for processing. In this fashion, the APU's 29 and 31 relieve CPU 1 of much of its processing requirements. Each APU handles multiple tasks, one for each incoming request. Each APU locks out the client's account from all other APU's while it processes the account related task and updates the client's account on disk 5. As noted above, a separate APU 27 is dedicated to multiplexing all input-output from each active task to the remote terminal which initiates its respective service request.

All tasks access and update pertinent system data (for example, prevailing rate of return, loan withdrawals, etc.) through the global common memory area 8. There should be no competition to update (lock-out) the same client account file, since the client only typically generates one account processing task at a time. Any conflicts arising from internal status inquiries via display terminals 9 are resolved by CPU 1 prior to task assignment, according to the priority of the requesting display terminal. For example, an inquiry from a company executive would be honored over any other remote terminal inquiry.

Figure 3A:
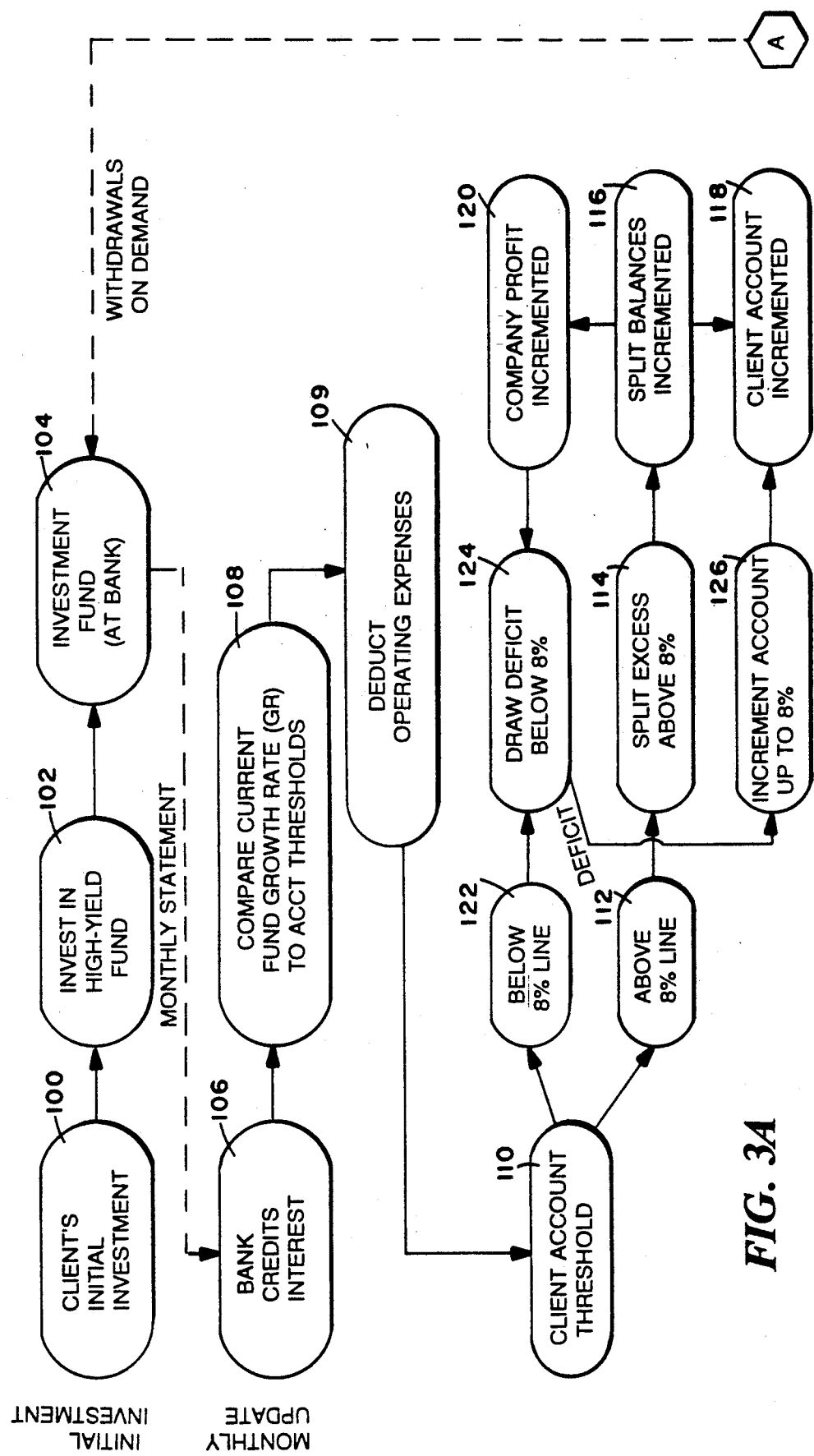
FIGS. 3A and 3B are schematic diagrams depicting the transactions which the data processing system of the present invention controls and monitors.
Figure 3B:
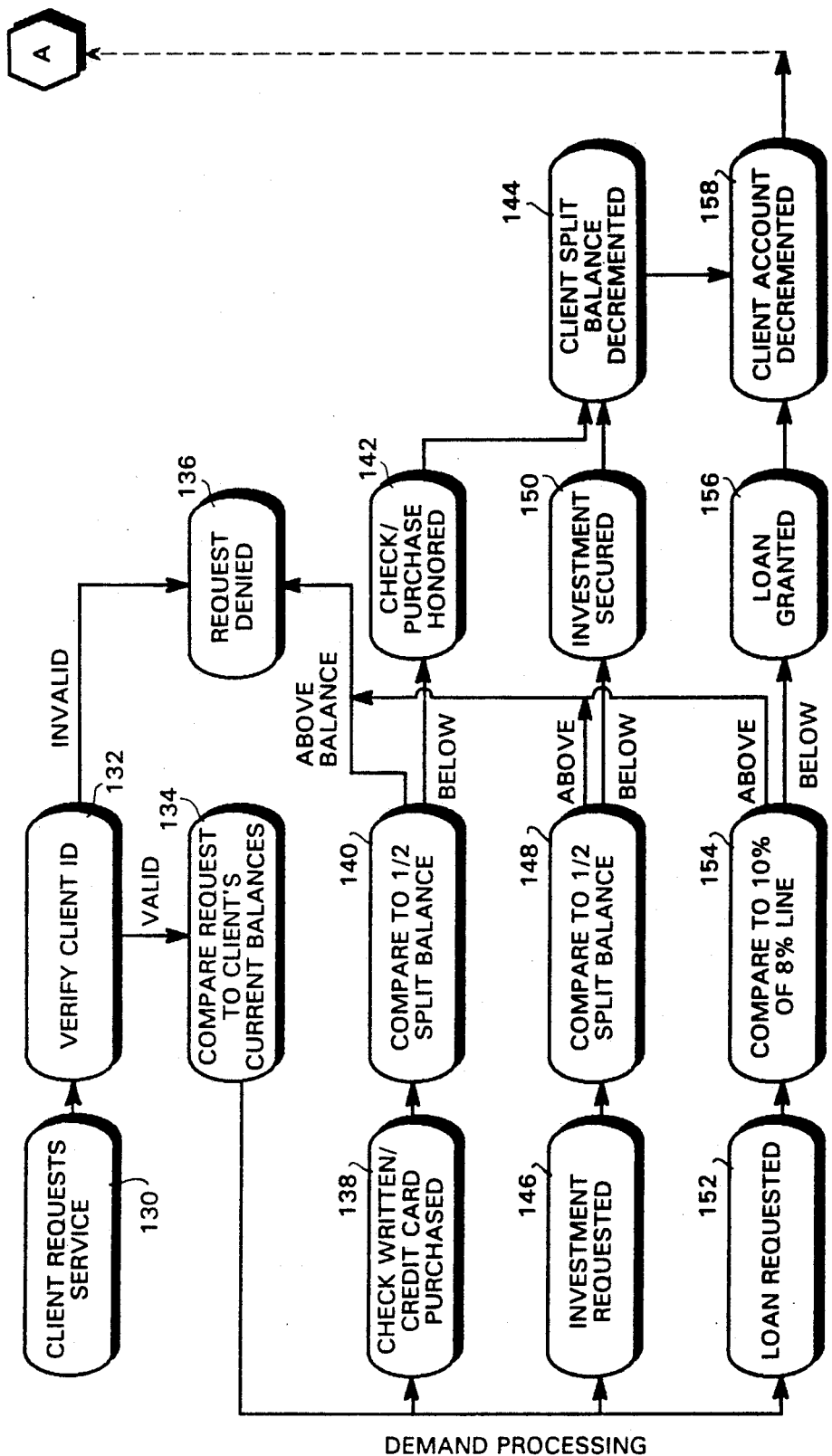

Before describing the software related subsystems of an exemplary embodiment of the present invention, FIGS. 3A and 3B will be initially described. These figures generally depict the nature of the transactions for which the system is responsible for monitoring and controlling. In this regard, the transaction flowchart shown in FIGS. 3A and 3B may be logically divided into initial investment monthly updating, and demand processing subsections. The system software which implements the monthly update and service on-demand sections is described in detail below.

As shown in FIG. 3A, entry into the system begins with a client's initial investment (100). The initial investment and the periodically received monthly payments are placed into a high-yield fund at a financial institution such as a brokerage house or a bank (102). The high-yield fund reflects the pooling of all client investments into a common investment fund at the financial institution (104). The prevailing interest rate (i.e., the predetermined rate of return applied to the client accounts) is periodically fed back to the data processing system (106) (daily, weekly or monthly) so that the processing system can monitor the growth rate of the entire investment fund.

The current growth rate of the investment fund is thereafter compared with the individual client account thresholds (as will be explained further below) to determine the status of each client account (108). First, as indicated at block 109, current operating expenses are deducted from the growth amount attributed to each account. Then, as indicated at block 110, the performance of each account is evaluated each month based on the current rate of return which is compared with the return generated by an 8% interest rate.

If the account is performing above the 8% growth rate (112), then the excess above the 8% growth line is split into two equal portions (114). As shown at block (116), the split zone balance is incremented to keep track of the total amount of funds associated with the account which is in excess of the 8% growth line. The funds in the split zone are split between company profits (120) and the client account (118) and associated balances in the client's stored account record are incremented at 120 and 118, accordingly.

Alternatively, if the account is performing below the 8% growth line (122), then the deficit below the guaranteed 8% rate is drawn from the company profits (120), as indicated at (124). These funds are used to increment the funds in the account to place the account growth rate back on track at the 8% growth line (126 and 118).

In addition to initial investment and monthly update processing, as shown in FIG. 3A, the system also is responsible for demand processing tasks based on client requests for service (130), as shown in FIG. 3B. The service takes the form of either a check written or credit card purchase (138), an investment request (146) or a loan request (152) If desired, yet other services may be associated with the account, such as, for example, travel service processing requests, as described in the applicants' U.S. Pat. No. 4,885,685, which patent has been incorporated herein by reference.

Initially, after a client request service (130), is it necessary for the system to verify the clients' identification (132). If the clients' ID is invalid, then the service request is denied (136). If, however, the client's ID is valid, then the service requested by the client is compared to the client account current balances (134).

As indicated above, the system places certain restrictions on check writing, investment requests and loan requests privileges. More specifically, checks may be written on up to one half of the client's split of the excess fund over the 8% growth line. Similarly, by way of example only, investment requests are limited to the same amount. Independent of these privileges, however, a loan request may be granted for up to 10% of the funds currently indicated by the 8% growth line.

Focusing first on checks written (138), a comparison is made of the amount of the check (or credit card purchase) with one half of the client split balance (140). If the check amount is above this balance, then the request is denied (136). However, if the check is below this balance, then the check is honored (142) and the client's split balance is decremented by the amount of the check (144).

Similarly, for an investment request (146) a comparison is first made between the amount of the investment request with one half of the client split balance (148). If the investment request is above the predetermined balance, the request is denied (136). Alternatively, if the request is below this balance, then the investment is secured by the managing company (150) and the client's split balance is likewise decremented (144).

Finally, for a loan request (152), a comparison is made between the amount of the loan r--quest with a predetermined loan percentage (e.g., 10%) of the current 8% growth line (154). If the loan request is above this authorized loan limit, then the request is denied (136). If the loan request is below this limit, the loan is granted (156) and the client's loan limit is decremented by the amount of the granted loan (158). Similarly, in addition to the client's split balance being decremented when a check is honored (142) or an investment is secured (150), the client account is likewise decremented (158). Funds for honoring the check, securing the investment, and granting the loan are extracted from the investment fund (104) as indicate by the dashed line leading thereto from block 158.

Figure 4A:
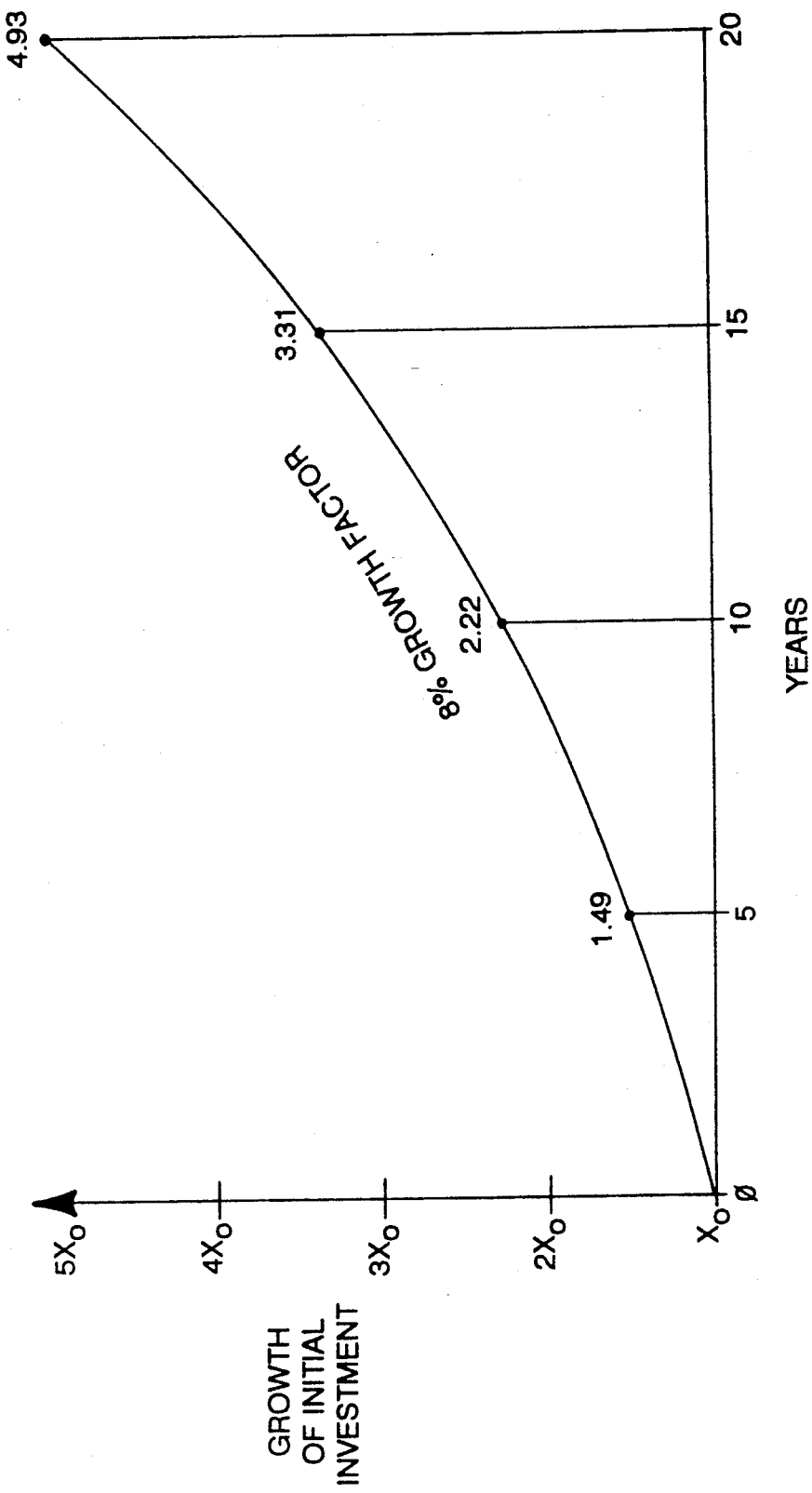
FIGS. 4A–4C are graphs depicting investment growth at different rates over time.

Turning now to FIG. 4A, this graph plots the growth of an initial investment base as a function of years during which an investment is compounding monthly. FIG. 4A shows graphically how an initial investment will grow based on an 8% rate of return compounded monthly. For example, if the initial investment $X_O$ is $100.00 dollars, at the end of five years the 100.0 dollars will multiply by a factor of 1.49 to mature to 149.00 dollars. At the end of 10 years the 100.00 dollars will be multiplied by a factor of 2.22 to mature into 222.0 etc. The growth factors shown in FIG. 4A, i.e., 1.49 and 2.22, 3.31, and 4.93, remain the same regardless of the amount of the initial investment. Thus, growth factors may be used to determine a projected value for the growth of an account after N years based on any initial investment base $X_O$.

The present investment indexing concept and implementation is based on placing the initial investment base into higher-yield funds (usually 12 to 20%) such as, for example, zero-coupon and tax-deferred investments. These invested funds are tracked and managed to insure the achievement and progress towards a predetermined objective, well above the guaranteed minimum ration of return.

As indicated above, the investment controlling company guarantees a predetermined ate of return for a participants investment which, by way of example only, is presumed to be 8% herein. Because the 8% growth of an initial investment base is being guaranteed by the company, in order to determine projections associated with every client account, the growth factors for the 8% rate of return form a first month of an initial year through the last moth of, for example, the 30th year are stored in a table in memory to enhance the efficiency of projection calculations. In this fashion, the projections calculations do not need to be repeated each time a projection is made. By this process, a small amount of inexpensive memory storage for these tables can be exchange to reclaim far more expensive processing time in making redundant calculations.

Using these growth factors the system independently tracks the accumulations of two independent funds within each account. The two funds are the initial investment fund "Bal" and the monthly payment fund "Y". Upon entry into the program, the initial investment at time $T_O$ to Bal (original balance) plus $Y_O$ (the first monthly payment). To find the balance of the account for any given year (i.e., the ith-year value) and/or the balance at the end of the agreed-upon timeframe (i.e., the Nth year value), the system initially assumes that $Bal_O$ is equal to $Bal_{i-1}$ and $Y_o$ equals $Y_{i-1}$ (that is, for i starting at a value of 1). The final balance, $Bal_N$, is the projected accumulated value of the account due only to the growth of the initial investment at the end of the program (i.e., year N). To find $Bal_N$, a series of intermediate calculations must first be made for $Bal_i$ which is the balance for each intervening year i up to year N. Stated mathematically, the final balance ($Bal_i$) may be calculated for any given year (i) for which the beginning balance $Bal_{j=0}$ is known, as follows:

$$Bal_i = \sum_{j=1}^{12} Bal_j \left(1 + \frac{I/12}{12}\right) \quad \text{EQUATION (I)}$$

Equation (I) above gives the ith year investment accumulation for the twelve months in that year, where the interest is compounded monthly. To find the accumulation of the initial investment over the years, $Bal_N$ is equal to the sum of the $Bal_i$ for all the years from to 1 to N. Stated mathematically, the final balance ($Bal_N$) may be calculated at year N by summation of each $Bal_i$ in equation (I) above for the intervening years i, as follows:

$$Bal_N = \sum_{i=\text{current year}}^{N} Bal_i \quad \text{EQUATION (II)}$$

The I used in equations (I) and (II) is the predetermined interest rate (e.g., 8%), which is used for projection the account growth.

To determine the account accumulation $Y_N$ attributable solely to monthly payments at year N, a similar series of calculations must be made. To find $Y_N$, $Y_i$ must likewise be calculated to determine the accumulation, during any given year i in the account due to the monthly payments. Stated mathematically, the final balance ($Y_N$) may be calculated for any given year (i) for which the beginning balance $Y_{j=0}$ is known, as follows:

$$Y_i \sum_{j=1}^{12} (Y_{j-1} + Y_o) \cdot (1 + I/12) \quad \text{EQUATION (III)}$$

$Y_O$ in equation (III) above represents the monthly payment that the participant initially agreed to make, compounded with interest each month. The variable J which varies from 1 to 12 reflects each of the months in the year. To find $Y_N$ which is the accumulation of monthly payments at the end of the program when the client's target goal is reached, the above $Y_i$ must be summed from the year 1 through year N. Stated mathematically, the final balance ($Y_N$) may be calculated at year N by summation of each $Y_i$ in equation (III) above for the intervening years i, as follows:

$$Y_N = \sum_{i=1}^{N} Y_i \quad \text{EQUATION (IV)}$$

The growth due to the initial investment $Bal_i$ and the growth due to monthly payments $Y_i$ are considered separately here because they may grow at different rates due to fluctuations in monthly payments. However, the total value of the account at any given time is the sum of the accumulation due to the initial investment $Bal_i$ plus the accumulation due to monthly payments $Y_i$. Assuming the client's monthly payment remains constant at $Y_o$, the above equations (I) through (IV) can be reduced to a single equation (V) to find the total $Bal_N$ projected for year N. Stated mathematically, the final balance ($Bal_N$) can be calculated by summation of $Bal_i$ for each intervening year (i) for which the beginning balance ($Bal_{j=0}$) is known and the monthly payments ($Y_O$) remain constant, as follows:

$$Bal_N = \sum_{i=\text{current year}}^{N} Bal_i = \left[ \sum_{j=1}^{12} (Bal_{j-1} + Y_o) \cdot \frac{(1+I)}{12} \right] \quad \text{EQUATION (V)}$$

The time required for a given initial investment $X_O$ to reach a predetermined desired target amount M varies dramatically as the rate of return (or interest rate I) varies that is applied to the initial investment. A growth factor table is shown below which indicates the growth factors for an initial investment for interest rates of 8%, 10%, 12%, 14% and 16% across increasing timeframes of 5, 10, 15, 20, 25, and 30 years. These factors have been calculated using the equations discussed above for calculating $Bal_N$. The values shown in this table have been plotted in FIG. 4B, which graphically illustrates the rapid use in growth rate of an initial investment $X_O$ over time in years N) as a function of increasing interest rate (8%, . . . , 16%).

| | GROWTH FACTOR TABLE | | | | |
|---|---|---|---|---|---|
| TIMEFRAME | INTEREST RATE (compounded monthly) | | | | |
| (years) | 8% | 10% | 12% | 14% | 16% |
| 5 | 1.49 | 1.65 | 1.82 | 2.01 | 2.21 |
| 10 | 2.22 | 2.71 | 3.30 | 4.02 | 4.90 |
| 15 | 3.31 | 4.45 | 6.00 | 8.07 | 10.85 |
| 20 | 4.93 | 7.33 | 10.89 | 16.18 | 24.02 |
| 25 | 7.34 | 12.06 | 19.79 | 32.45 | 53.17 |
| 30 | 10.94 | 19.84 | 35.95 | 65.08 | 117.72 |

Figure 4B:
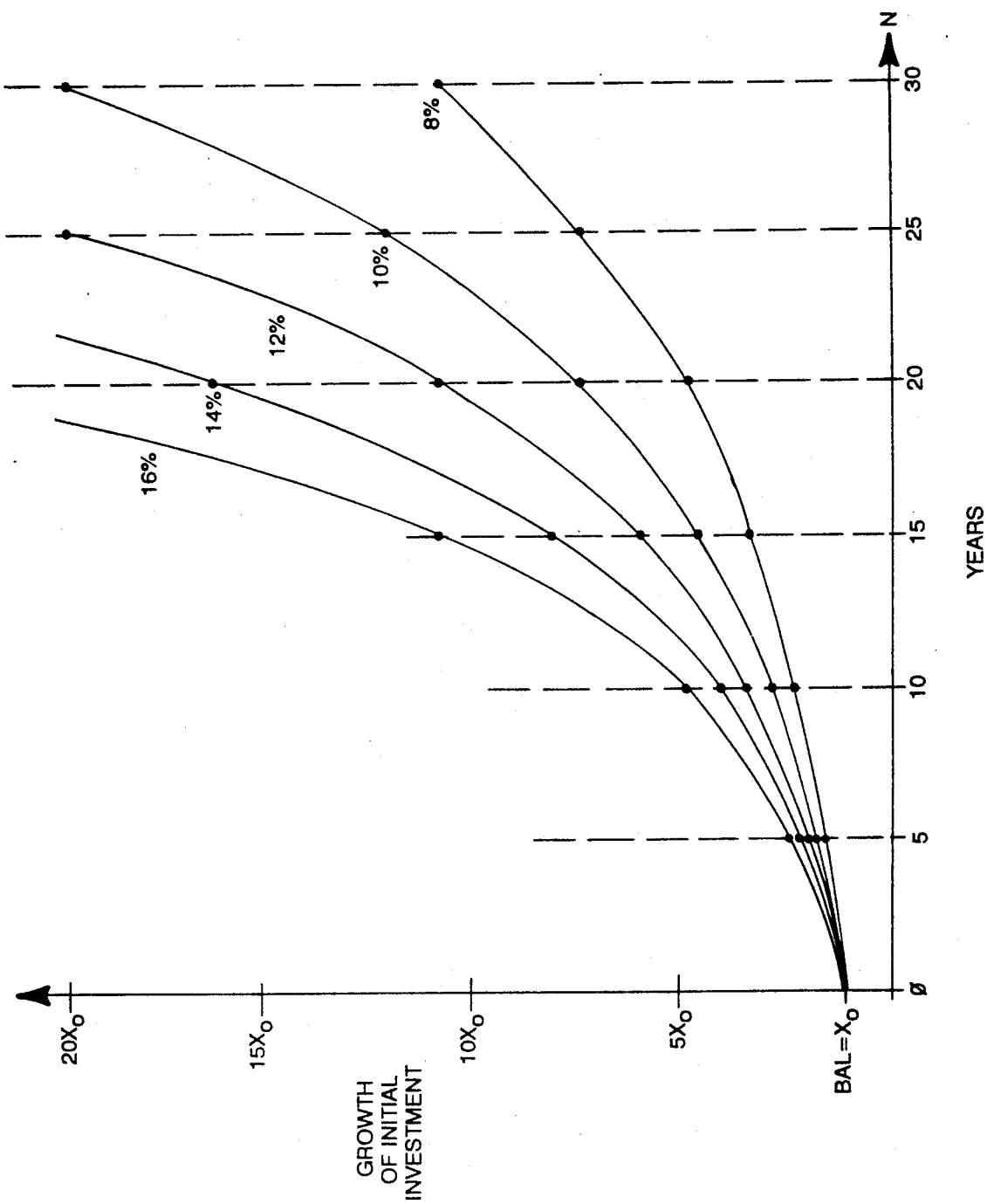

Focusing, for example, on the 10% growth curve, at the end of thirty years, FIG. 4B shows that an initial investment will have grown by a factor of 20 times. However, at a 12% rate of return, an initial investment will be multiplied 20 times in only 25 years, a net savings of 5 years. Thus, while the system is designed to make projections and guarantee a predetermined rate of return, e.g., 8%, both the controlling investment company and the participant may reasonably expect the investment to perform at a higher rate of return where both parties split the excess over the guaranteed minimum 8% rate of return.

An exemplary embodiment of the present invention permits a participant to select upon entry in the program an initial fund investment base $X_O$, a monthly payment $Y_O$ and a target amount M that the participant sets as an achievement goal. With these three parameters $X_O$, $Y_O$, and M and with the investment company guaranteed rate of return being at a predetermined level e.g., 8% (compounded monthly), the system is able to project the number of years N (to the nearest month) that it will take the participant's investment to reach the desired target amount M. The number of years projected is intended to be a maximum limit only, since the investment account performance is expected to be above the chosen guaranteed predetermined rate of return.

Figure 4C:
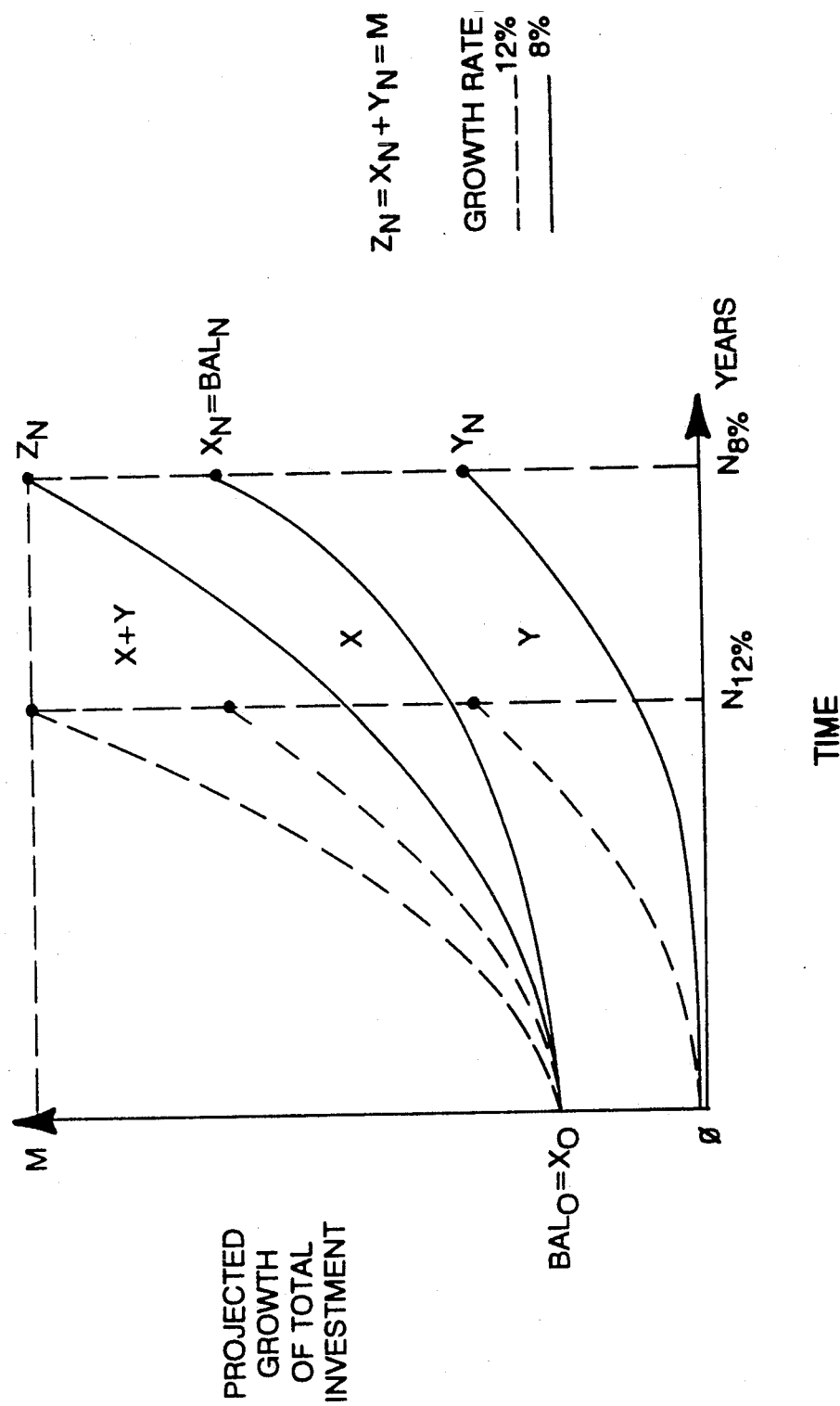

FIG. 4C shows an exemplary plot of how the projected growth of the total investment accumulates over time. On the time scale, points are labeled for year $N_{8\%}$ and year $N_{12\%}$ which represent the number of years that it will take the total investment base to reach the target goal, if the rate of return stays at 8% or alternatively, at 12%. As shown in FIG. 4C, the total amount in the account at any given time is equal to the sum of the amount in the account due to the growth of the initial investment, $Bal_O = X_O$, plus the accumulation due to constant monthly payments $Y_o$ (where X and Y may be calculated as described in detail above). FIG. 4C shows graphically how the independent Y curve accelerates the X curve toward target amount M.

Thus, by knowing the initial investment amount $X_O$, the monthly payments $Y_O$ and the target amount M, the number of years N that it will take to reach the target amount (to the nearest month) may be determined by using equation V above. Initially, a calculation is made as described above to find $Z_i = X_i + Y_i$. After calculating $Z_i$ for each year (from 1 through, for example, 30), a determination is made as to whether $Z_i$ is greater than the target amount M. If so, then N is set equal to $i-1$. A determination is then made for Z at the year $i-1$. Thus, once the total amount in the account, $Z_i$, is greater than the target amount M at year $N+1$, then the equation index i must be reduced by 1 to declare the number of years N.

Thereafter, a calculation is made to determine the nearest month at which the target amount is reached. Thus, while varying the equation index j from 1 to 12, if $Z_j$ becomes greater than M, then N must be set equal to $N+j/12$. In this fashion, the year and the month at which the target amount is reached can be precisely calculated for any given predetermined rate of return. If desired, the number of years projected to reach the participant's target amount may be determined for a range of reasonable rates of return on investments (e.g., 10%, 12%, etc.) and supplied to the participating client.

Figure 5:
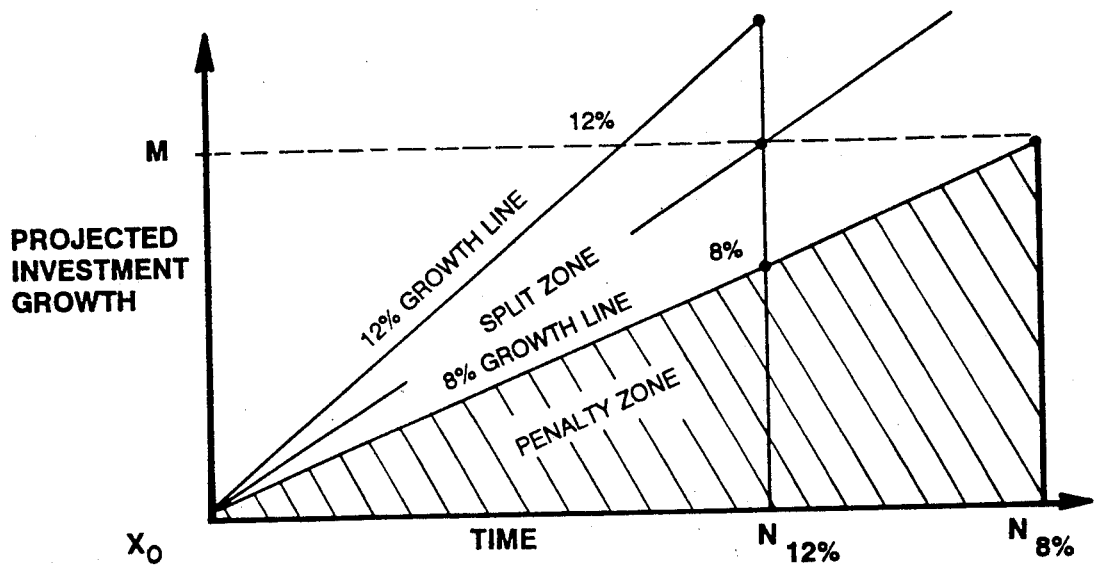
FIG. 5 is a plot of investment growth in different zones over time.

FIG. 5 shows a plot of investment growth over time and generally depicts the modes of system operations triggered by investment performance. Once the client has selected his parameters (M=target amount, $X_o$=initial funds, $Y_o$=monthly payment) then the company guarantees N=number of years to achieve the target amount (based on I=8% growth rate compounded monthly). The account growth at the guaranteed exemplary rate of return 8% is referred to as the 8% growth line. Any growth above the 8% growth line reflects account performance in the "split zone" (e.g., 12% growth rate) and is evenly split between client and company.

Any growth below the 8% growth line reflects account performs in the "penalty zone" (e.g., 6% growth rate) and is a deficit that comes out of company's share of the split. If the account performing at exactly an 8% rate of return then the target amount M will be reached at year $N_{8\%}$.

Assuming that the account experienced a steady 12% growth rate, the client may leave his share of the split in the account, thereby dramatically compressing the number of years to his target M, as illustrated in FIG. 5 at year $N_{12\%}$. Otherwise, he may withdraw up to one half of his "split" by writing checks against that amount, and/or he may invest up to one half his split in investments of his own choosing. In the case of a missed payment, the company will debit the errant client account just as if a check were written. (This default accommodation, of course, can continue only so long as the client has "split" funds remaining.)

Furthermore, as an added accommodation, the client may borrow against his account up to a 10% margin of the current 8% growth line (repayment can then be "piggybacked" on top of his monthly payment).

Finally, the client can "simulate" higher interest rates, or simply play "catch-up" for missed payments, by adding "accent" payments to his regular monthly payment or by making payments at a different yearly cycle, i.e., 15 per year instead of 12 per year. Accent payments are similar to increases "piggybacked" for loan repayment.

Figure 6:
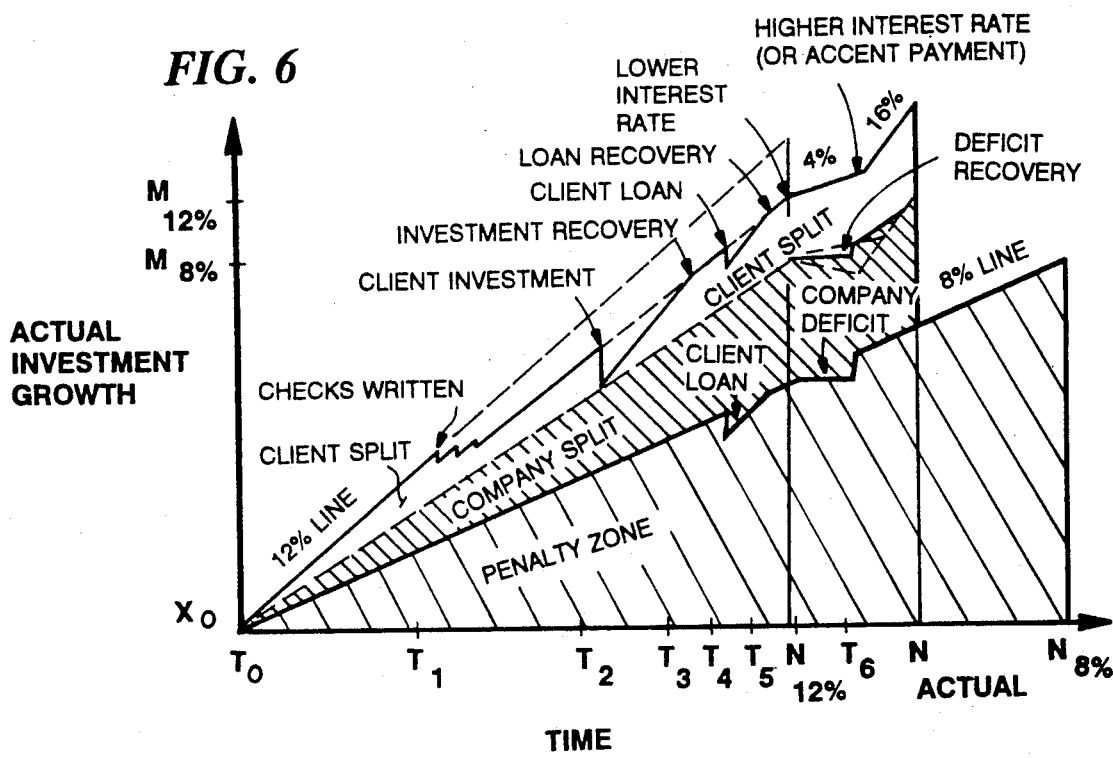
FIG. 6 is a plot showing exemplary account fluctuations over time.

FIG. 6 graphically portrays account fluctuations over a period of time during which a client exercises his check writing, investment and loan privileges under varying market condition. Just as in FIG. 5, the company guarantees at least an 8% growth rate at all times, maturing upon reaching the predetermined $N_{8\%}$ years (as shown above). By way of example only, the initial growth rate of the initial investment $X_o$ is presumed to be 12% at time $T_o$ yielding a 4% excess, in the "SPLIT ZONE" (which is split between the company and the client).

At time $T_1$, the client exercises his check-writing privilege up to the account limit (½ the client split). The account then continues upward again at a 12% rate. These checks are considered permanent withdrawals that do not have to be repaid by the client.

At time $T_2$, the client exercises his personal investment privilege up to the account limit (½ the client split). The account then continues upward again at a 12% rate. However, the return on the client's investment must be placed back into the account until the amount invested is restored at time $T_3$ (investment recovery date). Thereafter, the proceeds go directly to the client or to the account, at his option.

At time $T_4$, the client exercises his personal loan privilege up to the account limit (10% of the 8% growth line). Hence, this loan privilege is always available, even if there is no cumulative excess to draw from. The payments are piggybacked onto the regular monthly payment until it is restored at time $T_5$ (loan recovery date).

At year $N_{12\%}$, the account would have reached the target M had the client not written checks earlier at time $T_1$. At this juncture the graph presumes that the rate of return drops drastically to 4%, well below the company-guaranteed 8%, resulting in a deficit. The company therefore has to divert funds from the company's split to compensate so that, by time $T_6$, the account has recovered from the deficit. As a result, the account reaches target M on time at year $N_{ACTUAL}$. At the time $T_6$, the interest rate jumps dramatically to 16% which accelerates reaching the target amount M by year $N_{ACTUAL}$. Alternatively, the client could have elected to add accent payments resulting in the same acceleration toward target M.

Figure 7:
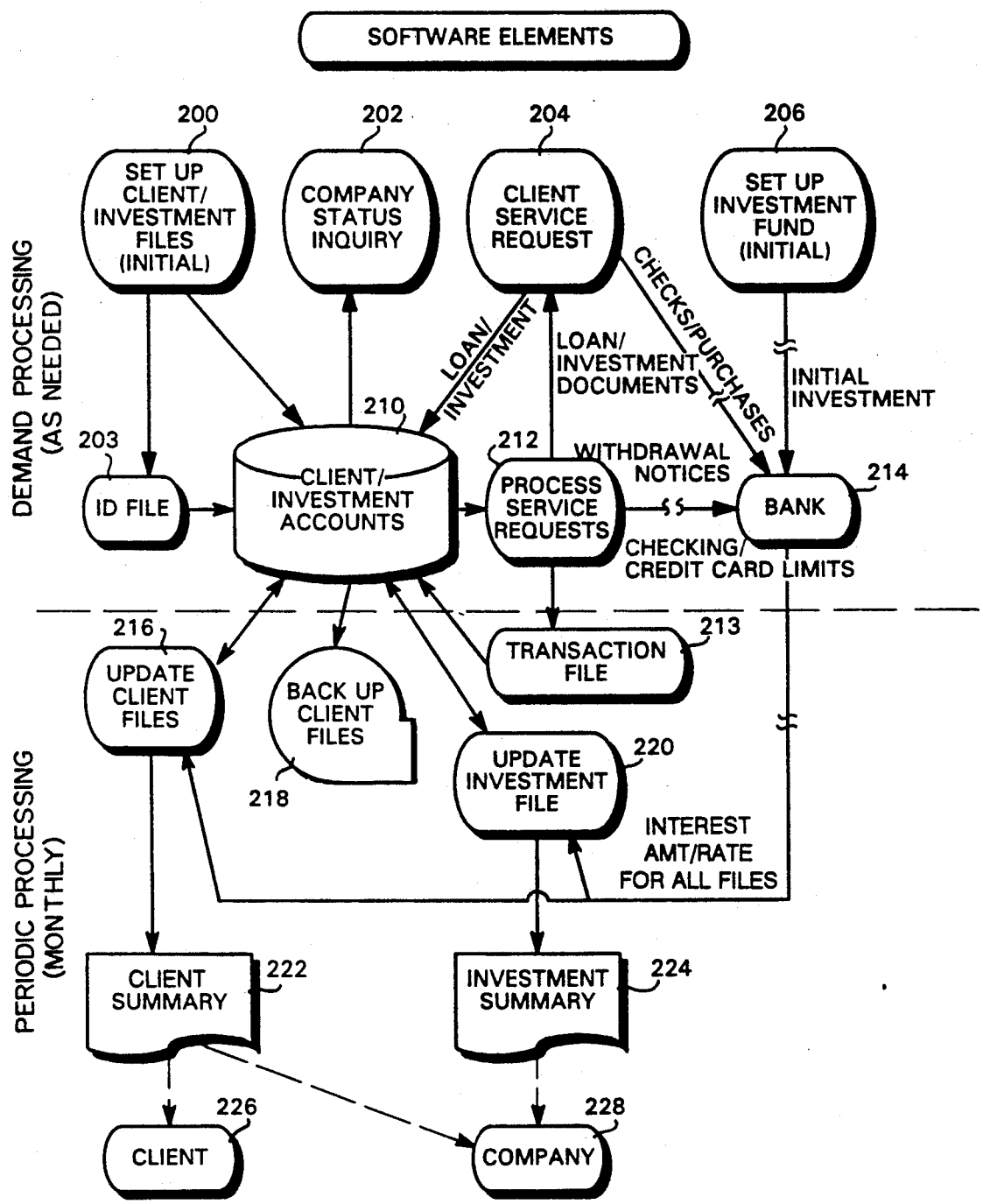
FIG. 7 is a schematic diagram of a system including the software elements of the present invention.

FIG. 7 is a schematic block diagram of the present system highlighting the software elements necessary to control the computer system shown in FIG. 1 so as to implement the present invention. The elements shown above the horizontal dotted line in the center are event-driven and function to enter or process data as needed on demand. The elements below the dotted line process data periodically (e.g., daily, weekly, monthly) to repetitively perform predetermined tasks.

As indicated at block 200, the system must initially set up the client and investment files which are stored on the disk 3 shown in FIGS. 1 and 2. Likewise, in order to initialize the system, the investment fund must be set up in conjunction with a financial institution such as a bank or brokerage house (206, 214). Part of the initial set up for a new client account file involves assignment of a security ID code to the new client. These ID codes are stored in ID file 203 whose file format is shown below.

| ID FILE FORMAT | | | | |
|---|---|---|---|---|
| ACCOUNT # current/ transferred | ID # current/last | NAME | ADDRESS | START/ DATE mo/yr |
| A | aaaa | | | |
| B | bbbb | | | |
| C | cccc | | | |
| . | . | | | |
| . | . | | | |
| Z | zzzz | | | |

The ID file which is stored on disk 3 has been strategically segregated from the main CLIENT ACCOUNT files to protect the valuable ID#'s from casual observation by system operators. Access to this file is granted by the system only to the individual acting as system administrator through the system console (23) of FIG. 1. The ID#'s have not been inserted in the CLIENT ACCOUNT format, and their usage is confined to being entered by the operator (called by the client) and validated by the system, all without screen presentation. Up to four (4) successive attempts are allowed before the system suspends the account and demands confirmation in writing that the client himself is attempting to enter the wrong ID#. The ID numbers can be easily changed periodically or upon an unauthorized access attempt with proper notification to the client at the address of record.

The system software also permits company management officials to make status inquiries of the system (202). As indicated by block 204, the present system responds to an input client service request for a loan or investment request by transferring client account indicia to a process service request routine 212 via disk memory in which client/investment accounts are stored. Client service requests in the form of checks written or credit card purchases drawn on the client's account are processed by the bank (214) which is provided (via the process service request routine 212) with checking and credit card account limits such as those discussed above in conjunction with FIG. 3A and 3B. As will be explained further below in conjunction with FIG. 11, the process service request routine serves to verify a client's I.D., to determine whether the service request is within the boundaries discussed in conjunction with, for example, FIG. 3B. Presuming that the boundary checks yield satisfactory results, the output of the process service request routine will be loan or investment related documents (e.g., notification of securities purchased) which go to the client. Concurrently, with the issuance of such documents, as explained above with respect to FIG. 3A and 3B, a fund withdrawal notification is sent to the bank (214), thereby decrementing the investment fund by the amount approved for the loan or investment.

The process service requests routine 212 additionally serves to provide transaction data related to the investments or loans to the transaction file 213 which is also stored on disk 3. The transaction file collectively stores the ongoing transactions generated by all the accounts each day. This file permits transaction data to be readily accessed for account auditing and/or analysis. The transaction file headings and fields are self-explanatory and are discussed below in conjunction with the client account file format.

Focusing on the periodic processing that occurs within the system, the client/investment accounts 210 which are stored on disk are periodically backed up on the tape files 218. Presuming that the periodic processing is performed on a monthly basis, the client files would be updated once each month by an update client files routine 216 (which is discussed in detail below in conjunction with FIGS. 12A-12E) to reflect usage of the system throughout the month. Thus, while a client service request entry at 204 for a loan will serve to add an additional increment of indicia into the client's investment account stored on the disk 3, the update client files routine at 216 serves to provide a cumulative tabulation of all of the service requests that have been processed by the system. The update client files routine 216 will utilize data relating to the current account status, such as the available account balance, the target amount the client desires to reach, the client's monthly payment and the prevailing rate of return transmitted or received from the bank 214, to make projections as to how long it will take the client to reach his target goal at the 8% growth rate (and at current rates of return). Projections will also be made based on the clients adopting an accentuated payment schedule.

Once the client account files have been updated, they are stored back on disk for subsequent interrogation for the next service request. The process service requests routine (212) must be locked out during this update to avoid obtaining an out-of-date balance. Therefore, the update client files routine (216) must be run off-line during non-peak hours.

The update client file routine 216 will also generate a client account summary 222 which is transmitted to the client 226, as well as to the company 228. The client summary at 222 informs the client of not only the current status of his account, but also the projections made by the update client files routine 216.

The update investment file routine (which is described in detail below in conjunction with FIGS. 15A and 15B) shown at 220 serves to summarize the cumulative balance totals for each and every client in the system. In addition, the updated investment file routine keeps track of the company's aggregate profits as well as the funds expended to restore month-to-month account deficits, such as described during the transactions in FIG. 3A with respect to blocks 120, 124, and 126, if such deficits, in fact, ever arise. The updated investment file is stored back on disk for subsequent status inquiries 202. Just as with the update client files routine 216, the update investment files routine 220 must run off-line after hours, since it must lock out all other interrogations during the update.

The output of the update investment file routine is summarized in an investment summary report 224 which is transmitted to the company 228. Like the update client files routine 216, the update investment file routine 220 receives the prevailing interest rate which it utilized to project the cumulative growth of the overall investment base.

Before turning to the detailed program flowcharts, it should be noted that the flow of system control revolves around the ON/OFF control states of a unique set of control status words (CSW's), which are delineated, switch-by-switch, in the table below:

TABLE III

CONTROL STATUS WORDS (CSW'S)

| CSW switches | A ACCOUNT | P PAYMENT | C CREDIT | I INVEST | L LOAN | S SPLIT | D/O DEFICIT/ OPERATE |
|---|---|---|---|---|---|---|---|
| all OFF | all flags off for this account | no flags | no flags | no flags | no flags | no flags | no flags |
| 1 | Payment CSW ON | bal > 0 | bal = 0 | bal > 0 | bal > 0 | bal = 0 | bal > 0 |
| 2 | Credit CSW ON | payment = 0 | split = 0 | repayment = 0 | repayment = 0 | split = 0 | payment = 0 |
| 3 | Invest CSW ON | nonpayments > 1 | used for payments | used for payments | used for payments | used for deficit | unpaid deficit > 1 |
| 4 | Loan CSW ON | dep. req.d from client | max CREDIT exceeded | max INVEST exceeded | max LOAN exceeded | max SPLIT exceeded | dep req.d from co. |
| 5 | Split CSW ON | | | | | | |
| 6 | Deficit CSW ON | | | | | | |
| 7 | Operate CSW ON | | | | | | |

The relationship between these CSW's is as follows. Acsw ACCOUNT STATUS—indicates whether there are nay cautionary "flags" ON in any of the control status words (CSW's) for the client's account. If any CSW (P, L, I, C, S, D, O) has a flag ON, its associated switch (1, 2, ..., 7) is turned ON. Hence, if all CSW's for a given account are OFF, then the ACCOUNT status word CSW will have all switch positions (1, 2, ..., 7) turned OFF.

The remaining CSW's (P, L, I, C, S, D, O) have four ON/OFF "flag" switches (1, 2, 3, 4) which indicates an increasing degree of caution required on the given account:

| CSW SWITCHES | DEGREE OF CAUTION REQUIRED |
|---|---|
| all OFF | no flags - account is OK and on schedule towards target amount M. |
| 1 ON | an unfavorable condition exist - that is, there is either an unwanted balance (CSW's P/L/I/D) or a desired balance is zero (CSW's C/S) |
| 2 ON | the current, expected contribution to the account is zero (payment, repayment, or split amount) |
| 3 ON | negative account status - that is, the failure of expected contributions has occurred more than once (CSW's P/D), or some of the client's/company's split funds had to be used to cover the unpaid payments/deficits (CSW's, D/I/C/S) |
| 4 ON | worst-case account status - maximum available amounts have been exceeded and a client/company DEPOSIT has been required |

These CSW status "flags" 1-4 represent progressively more serious conditions. Thus, CSW status 2 will not be set unless status 1 is already ON, CSW status 3 will not be set unless status 2 is already ON, etc. Upon reaching CSW status 4, the system must take some action to correct the condition and/or to notify the client that the problem flagged is jeopardizing his chances of reaching target amount M.

Pcsw—PAYMENT STATUS—indicates whether expected monthly payments are current and on time (i.e., whether current balance of required payments exceeds amounts paid by client to date).

Lcsw—LOAN STATUS—indicates whether expected monthly repayments are current and on schedule (i.e., whether current balance of required repayments exceeds amounts paid by client to date).

Icsw—INVESTMENT STATUS—indicates whether expected monthly repayments are current and on schedule (i.e., whether current balance of required repayments exceeds amounts derived from accrued investment dividends, client "piggyback" payments, etc.), Ccsw—CREDIT STATUS—indicates that the client's credit balance has reached zero (i.e., no more credit in the form of check writing or credit card purchases can be extended to the client). This status is particularly serious if there is also no client split for the current month (Ccsw=2). It is even worse if this credit balance had to be used to cover missing payments (Ccsw=3).

Scsw—SPLIT STATUS—indicates that the company's split balance has reached zero (i.e., the company cannot draw any further upon this credit balance to pay for account deficits, operating expenses, etc.). Just as with Ccsw above, this status is particularly serious if there is also no company split for the current month (Scsw=2). Likewise, it is even worse if this credit balance had to be used to cover account deficits and/or operating expenses (Scsw=3).

Dcsw—DEFICIT STATUS—indicates that the account is currently showing a deficit (i.e., that the current deficit exceeds amounts paid by the to offset it). Just as with the CSW's above, this status is particularly serious if the company has made no current payment (Dcsw =2). Likewise, it is even worse if the company has not been able to cover a series of such unpaid deficits (Dcsw=3). This latter worst-case condition "triggers" the system to cover any remaining unpaid deficits with the clients accumulated share of the split (i.e., the remainder of the excess funds over the minimum guaranteed 8%).

Ocsw—OPERATE STATUS—indicates that the account has reached a deficit status in attempting to pay operating expenses (i.e., the current operation expenses exceed the company's available split funds). Just as with Dcsw, this status is particularly serious if the company has made no current payment (Ocsw=2). Likewise, it is even worse if the company has not been able to cover a series of such unpaid deficits (Ocsw=3).

Figure 8:
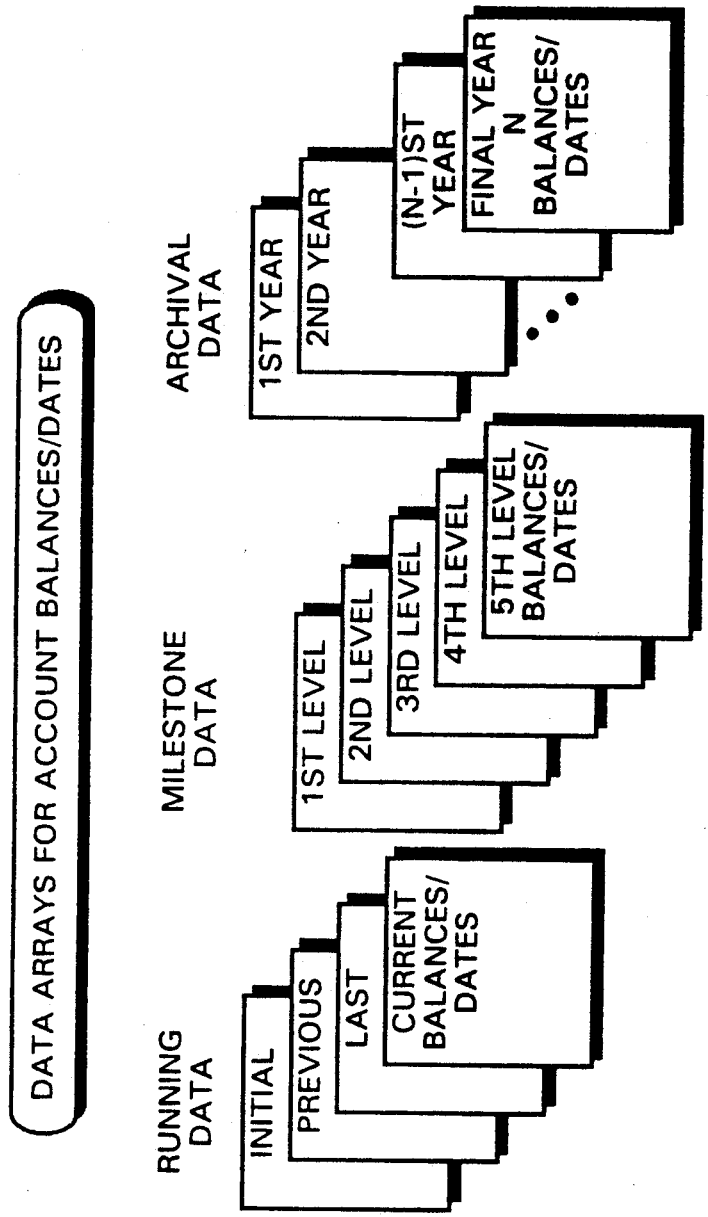
FIG. 8 is a schematic diagram of the data arrays utilized for storing account balances.

It is noted that each of the client account balances described hereinunder are stored independently on two sets of data arrays, i.e., the running and archival data arrays, which are shown schematically in FIG. 8. The running data array indexes the balances and dates on a monthly basis and stores such data for the current, last, previous and initial months. The archival data array indexes balances and dates on a yearly basis, which provides a convenient method, e.g., to generate end-of-fiscal year reports.

Thus, by utilizing the data arrays shown in FIG. 8, an operator can access current balances for clients, either based on the current month's performance, or based on any desired year in the course of the program. It is noted that with respect to the running data array, the array is conveniently structured so that the current month's balances and dates in the updating cycle may be shifted to the last month's location in the array, while the last month's data may be shifted to the previous month's location. Finally, to allow more detailed review by company executives, the important event-driven milestones, such as months in which there was company deficit, investment approval, loan recovery, etc., can be stored as separate levels in the milestone arrays shown in FIG. 8.

CLIENT AND INVESTMENT ACCOUNT FILE FORMATS

As noted in the above description of the system software elements, the client and investment accounts are stored on disk 3 in a format corresponding to the display or printer output format seen by the user. The client account file format is shown in FIGS. 9A and 9B.

The format headings shown in the left hand portion of the client account file are as follows: REPORT, CLIENT, STATUS, PARAMETERS, DATES, RATES, ACCOUNT SUMMARY, MONTHLY TRANSACTIONS, PROJECTIONS, THRESHOLDS, and BALANCES. The fields to the right of these headings are labeled in an essentially self-explanatory fashion (and will not be described in detail except as set forth below) to reflect the data which must be associated therewith. For example, with respect to the REPORT heading in the "TITLE" field, "Monthly Account Statement" would be inserted.

Figure 9C:
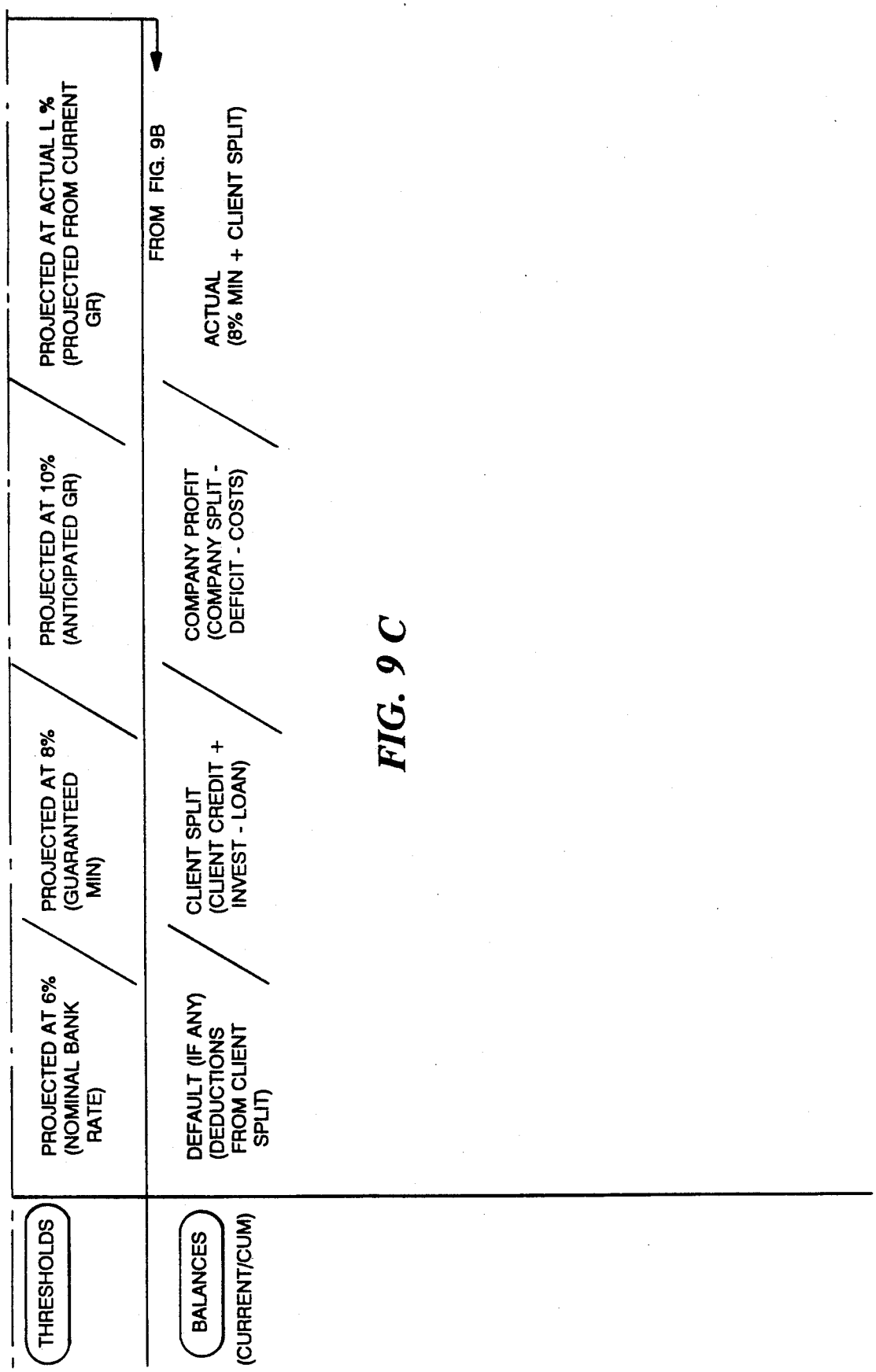

In FIG. 9A, the client's account number is inserted in the first field in the CLIENT heading. This field is utilized by the system software to access the client file. The LAST ACTIVITY field in the CLIENT heading reflects the date of the most recent account activity, e.g., loan, investment, etc.

Below the CLIENT heading, the client account format uniquely provides the control states of the control status words ACCOUNT, PAYMENT, LOAN, INVEST, CREDIT, SPLIT, DEFICIT, and OPERATING, which reflect the client account current status as explained above. The current control states of these control status words are stored in the client account file. Like the other information in the client account file, this information may be accessed and displayed upon demand by an operator at the monitor display terminals 9 shown in FIG. 1.

In the PARAMETER headings, the key variables relating to the client's initial deposit $X_o$, initial monthly payment $Y_O$, number of years $N_O$ to reach the target goal, and the target amount $M_O$ are stored. Thus, under the PARAMETER heading the system allows for the entry of data relating to original amounts upon entry of program and the current parameter value.

With respect to the DATES heading, the "start date" reflects the date that the client entered the program. The "repayment date" is the date projected by the system upon which a loan, investment, or deficit is going to be repaid. The "target date" field reflects the projected date at which the client will reach the target amount based on a projected 8% growth rate of the funds in the account. Thus, the target date is equal to the client's start date plus the number of years required to reach the target amount (presuming an 8% percent growth of funds). The "projected date" field reflects the date that the system projects that the target amount will be reached (presuming that the current growth rate is in excess of 8% and/or presuming that monthly payments made to the account will be in excess of the initial monthly payment commitment).

Under the RATES heading, the growth rate is the actual rate of return on the funds deposited in the account's investment institution. The year-to-date field reflects the fluctuation in the growth rate during the year from the minimum to the maximum growth rate. The interest rate field reflects the interest rate achieved by client-selected investments. As will be explained further below, the client is authorized to, by way of example only, invest ¼ of those funds accumulated in excess of the 8% guaranteed rate of return.

Below the ACCOUNT SUMMARY entries in the client account format, are THRESHOLDS, PROJECTIONS and BALANCES headings. Turning first to THRESHOLDS headings, the fields therein are utilized by the system to store projections as to how much the account would be currently worth if the rate of return for the amount invested would have been at 6%, 8%, or 10%. The current balance as reflected by the actual percentage growth achieved by the account is also indicated in the THRESHOLDS heading.

Under the PROJECTIONS heading, the trial deposit increment field allows an operator to insert a trial initial deposit $X_1$, while the next field allows the operator to input a trial monthly payment increment $Y_1$. With these trial amounts, the system calculates a reduced number of years $N_1$ to reach the original target amount $M_O$ and/or an increased target amount of funds $M_1$ that will be generated at the end of the original number of years $N_O$. This feature provides valuable incentive for the client to deposit an additional lump sum and/or to increase his monthly payment.

Under the BALANCES heading, a "default" field is provided which identifies current and cumulative amount of funds that the client owes but has not yet paid to cover loans or investments. Additionally, a required monthly payment that has not yet been paid would be reflected in the default balance. In the "client split" field, the clients share of those funds accumulated over the minimum 8% account growth rate is stored. It is calculated by adding the clients' credit funds plus the amount gained by the client from investments minus loan amounts. The "company profit" field reflects the company's share of this split of excess funds minus deficit and costs required to be paid by the company. The "actual balance" is the actual dollar amount of funds currently in the client's account and reflects the 8% minimum rate of return plus the client's share of the funds in excess of the minimum 8% growth rate.

Turning next to the client account format ACCOUNT SUMMARY data, shown in FIG. 9B, it is noted that all fields shown identify both monthly and cumulative amounts. The account summary format is divided into client account-related headings and company account-related headings. It is noted that the company's account-related data may be suppressed from any client account printout generated for the client's viewing.

In the account summary, the BALANCE field reflects the client's current balance and the minimum balance that must be achieved by the account, i.e., the balance at 8%. Under the PAYMENT heading $P_{RE}$-

$Q_{UIRED}$ is the required payment, $P_{RECEIVED}$ is the payment actually received from the client. This payment reflects the agreed-upon monthly payment $Y_O$. Under the CREDIT heading, $C_{LIMIT}$ is the maximum credit limit available to the client and may be, by way of example only, ¼ of the excess funds accumulated over the 8% minimum. $C_{AVAIL}$ reflects the amount of available credit in the client's account taking into consideration outstanding loans. The client may write checks against the $CA_{AVAIL}$ balance or similarly may make credit card purchases against this amount. Under the INVEST heading, $I_{LIMIT}$ is the maximum amount of funds which may be invested by the client and may be, by way of example only, ¼ of funds in excess of the 8% growth balance. When the client invests funds, the variable $I_{AVAIL}$ is reduced, which reflects the current amount of funds that are available for further investment.

The LOAN heading similarly reflects loan limit and loan available data. By way of example only, the loan limit is 10% of the clients 8% balance. In the present exemplary embodiment, funds deducted from the INVESTMENT and LOAN categories are required to be repaid by the client within a predetermined time frame, whereas deductions from the CREDIT field do not have to be repaid.

Under the COMPANY ACCOUNT major heading, the PROFIT heading reflects the company's profit which is the company's share of the funds over the 8% minimum client account balance. This company profit is projected to the end of the term of the client's account at year $N_O$ based on the current interest rate (above 8%).

Under the SPLIT field headings, $S_{LIMIT}$ reflects the company's share of the excess funds over the 8% minimum limit. $S_{AVAIL}$ reflects the amount of available credit in the company's account, which may be used by the company to pay deficits and operating costs when the prevailing interest rate falls below 8%.

The DEFICIT field reflects the cumulative funds that have been required to keep the client account at the 8% minimum balance. The $D_{PENDING}$ field defines the current outstanding amount of funds required to be paid by the company to bring the client account balance up to the 8% balance and the $D_{PAID}$ field reflects those funds actually paid out by the company. Hopefully, no entries will needed to be made in this field.

Under the OPERATING heading, operating costs are listed, such as expenses required to support the client's life insurance policy and other account maintenance expenses. As with the DEFICIT field above, $O_{PENDING}$ AND $O_{PAID}$ reflect the current outstanding and actually paid by the company.

Focusing at the left-hand portion of the ACCOUNT SUMMARY, the GROWTH field defines the current difference or "delta" between the current month and last month balances for the CREDIT, INVESTMENT and LOAN headings under client account data. In the company account data, the growth or "delta" in SPLIT data is shown. Under the DEPOSIT WITHDRAWAL heading, client deposits made during the month are shown, as well as total amount of checks, credit cards purchases, etc. The company's deposits that are made if, for example, a company utilizes funds from outside sources to support the account are also shown in the DEPOSIT heading.

Under monthly transactions, the PAYMENTS heading is broken down into REQUIRED, RECEIVED and DEFAULT subroutines. Default payments, by way of example only, are deducted from funds in the client's $C_{AVAIL}$ field. Thus, if a client fails to make a payment, in the present exemplary embodiment, the payment is deducted from his outstanding credit limit balance. It should, of course, be recognized that the system may be structured to handle a client's failure to make payments in some other manner without departing from the spirit of the present invention. Focusing on the company's account, operating costs and deficits, required to be paid by the company, are deducted from the company's split of the excess funds over the clients' 8% balance in the present exemplary embodiment.

Under the payments REQUIRED heading, the monthly payment is the client's agreed-upon initial monthly payment $Y_O$. No payment is required to compensate for any depletion of the clients available credit balance which reflects his share of the excess funds over the 8% balance. By way of example only, the investment available balance ($I_{AVAIL}$) is required to be paid as a separate payment in addition to the monthly payment (at a monthly payment of the outstanding client investment amount invested divided by 24) to ensure that the investment is repaid within 2 years. Similarly, the loan balance $L_{AVAIL}$) is required to be paid back at monthly payments equal to the outstanding loan amount divided by 12 to insure that the loan will be repaid within a year.

Under the company account heading, the cumulative deficits ($D_{PEND}$) are paid by the company and are referred to as $D_{OFFSET}$ payments. The cumulative costs which are ($O_{PEND}$) pending are the cumulative operating costs which must be paid by the company as $O_{OPERATE}$ payments in the exemplary embodiment.

If a client's received payment is in excess of the monthly payment due, the excess is added to the client's available credit and is referred to as a $C_{ACCENT}$ payment. If the client does not make the payment due or does not pay the required amount, these funds are reflected as DEFAULT payments due. Similarly, any shortage in the company's payment is reflected in the company's DEFICIT column. In the DEBITS heading at the left hand portion of the account summary, all amounts deducted from the account during the month are totaled including any default payments, all investments or loans by clients and all costs or deficits from the company account in the appropriate DEBIT field.

Figure 11B:
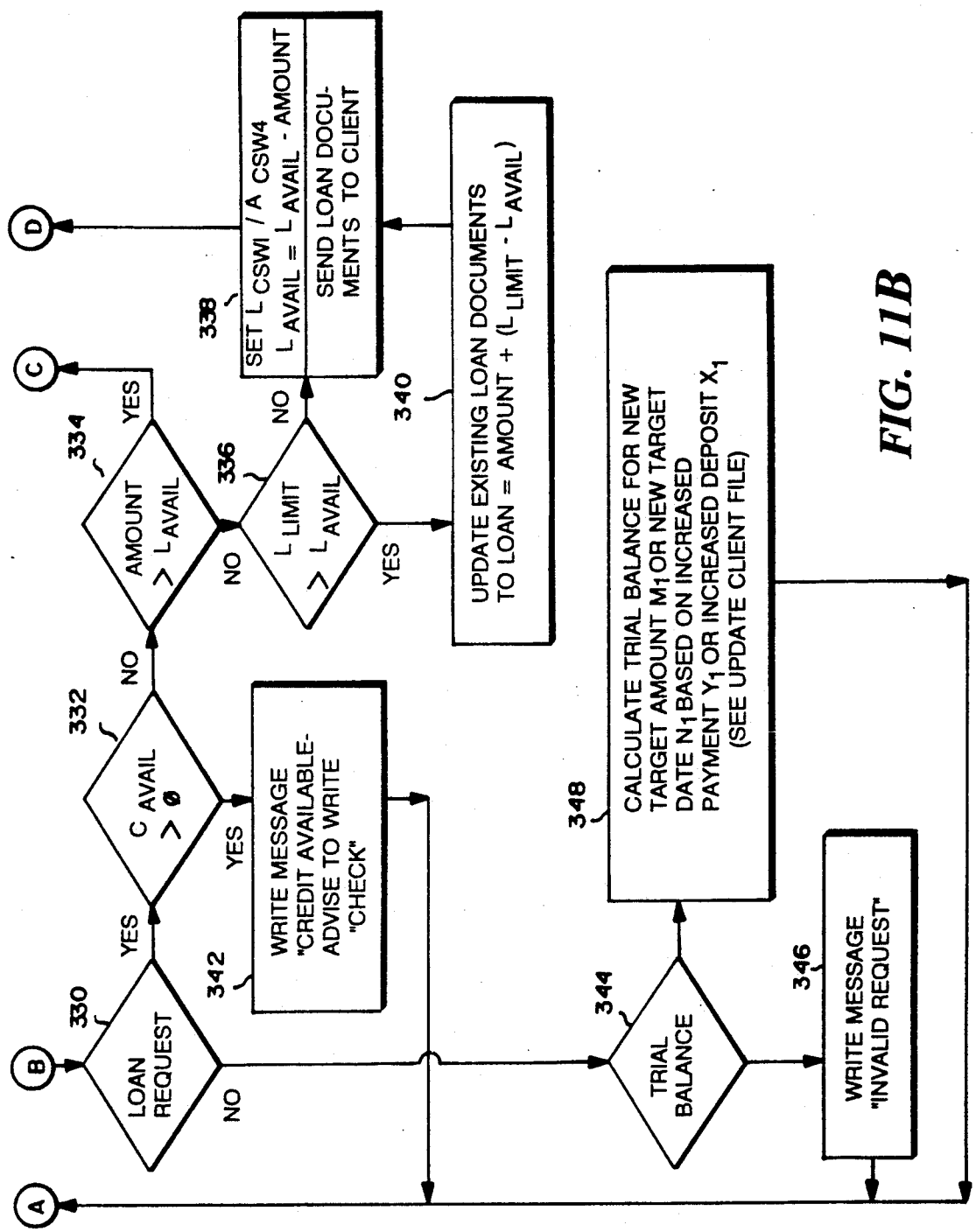
Figure 12B:
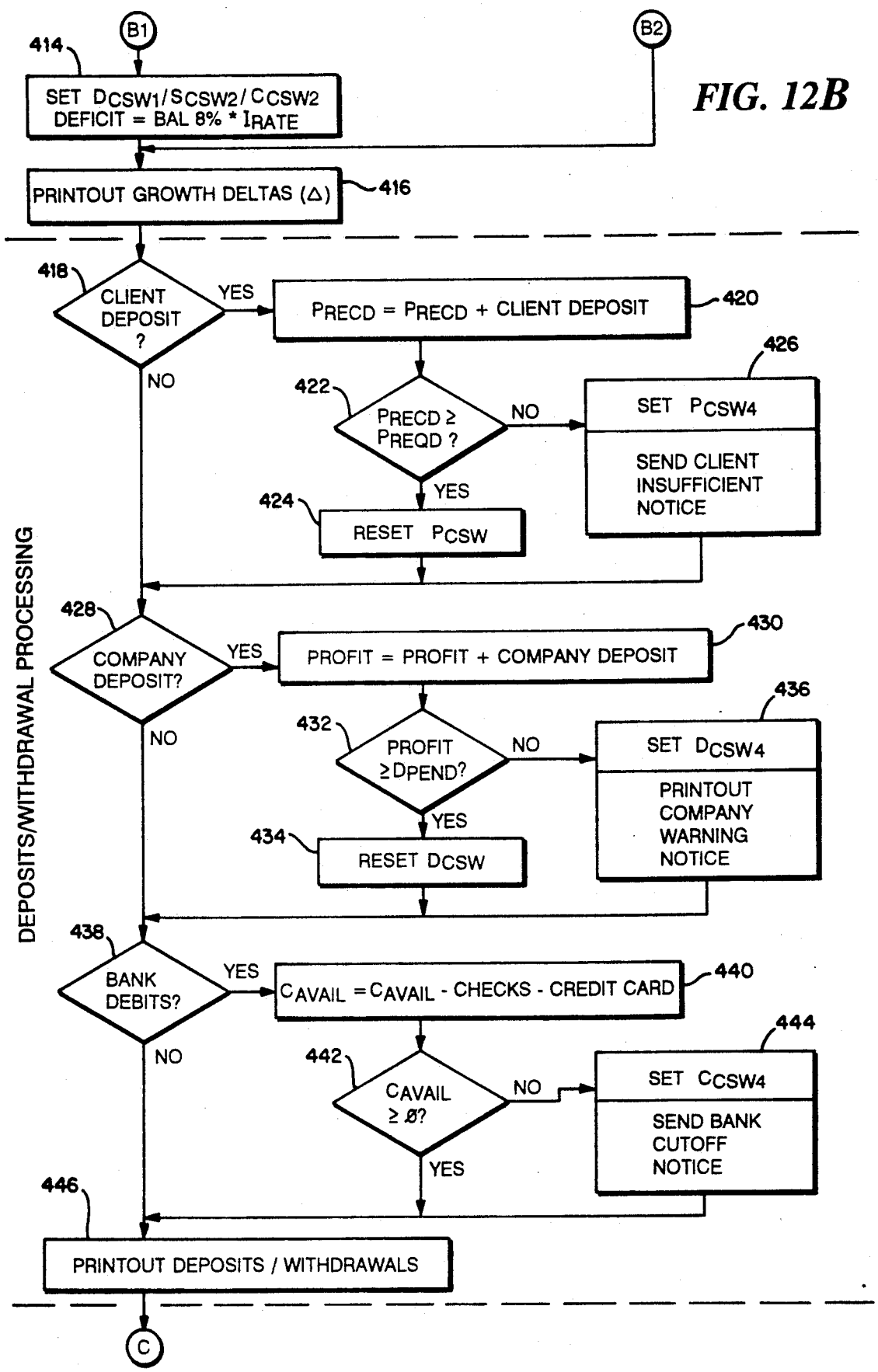
Figure 12C:
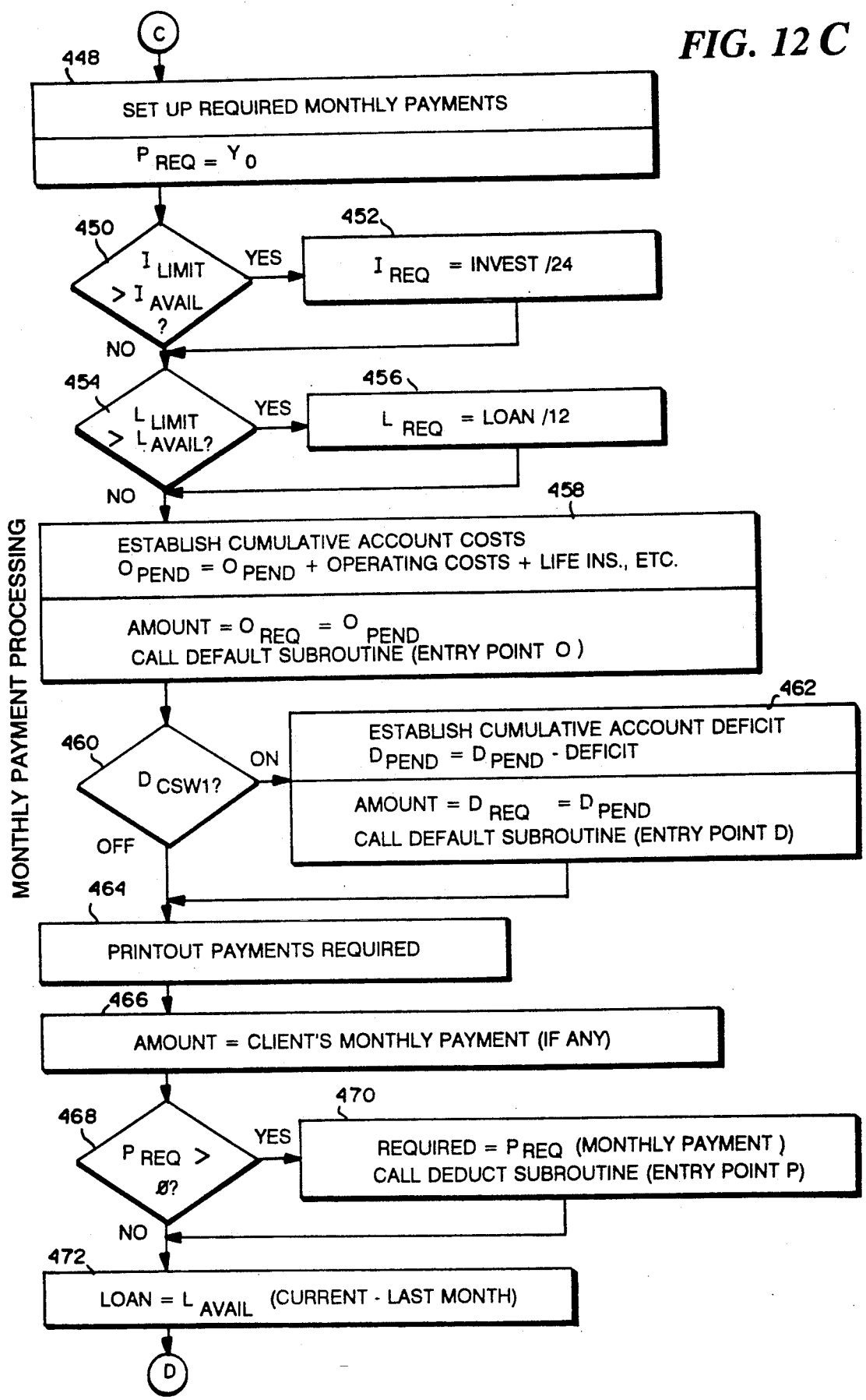
Figure 12D:
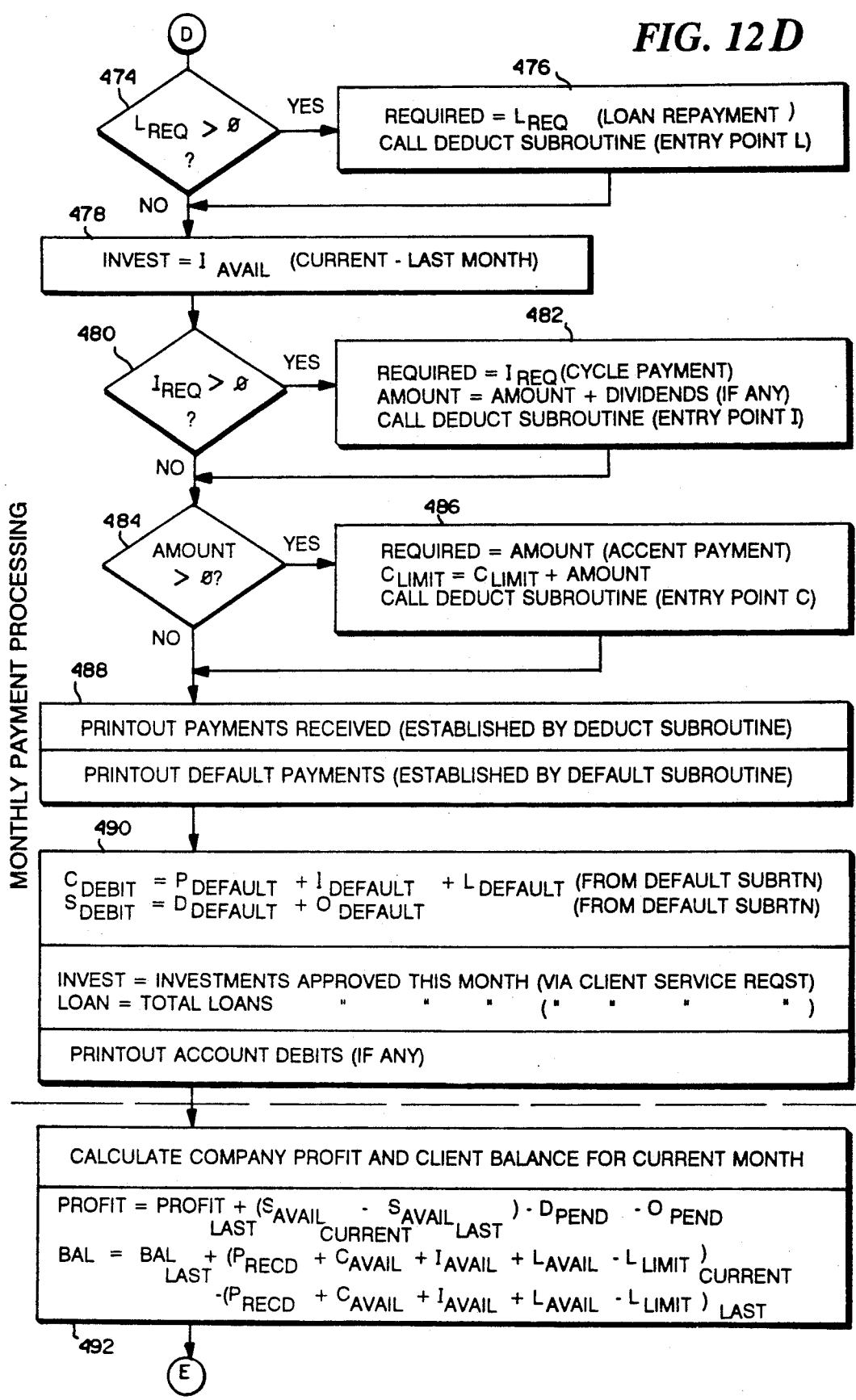
Figure 12E:
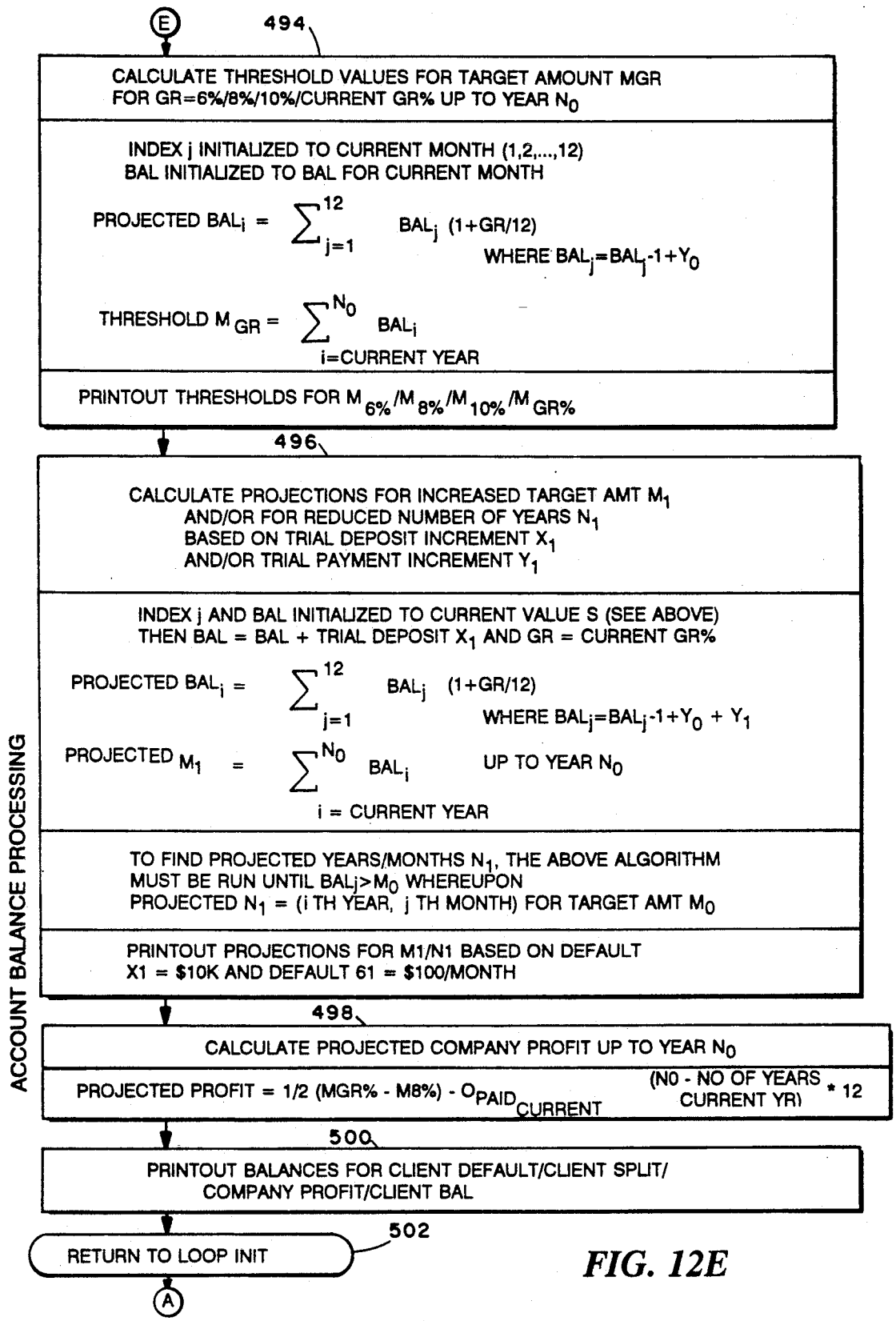

The investment account file format shown in FIG. 11 reflects cumulative statistics relating to the parameters discussed above in conjunction with FIGS. 9A and 9B for all clients who participate in the program. The report, bank, and rates headings contain data which is largely self-explanatory and will not be explained in detail except as indicated below. The BANK (or investment or brokerage house) heading provides for entry of a plurality of account numbers associated with all the funds in the program. The RATES heading reflects cumulative rates (as explained above with respect to the client file) for all the accounts. The THRESHOLDS heading represents cumulative data for all the accounts for the thresholds (6%, 8%, 10%, actual %) discussed above with respect to the client account.

In the BALANCES heading, the total sum of all the client balances and all the company balances (for both the current and last months) for each of the client accounts are reflected under this heading. The total balance of all the funds in the investment account for the current month is also stored in this field. The PAYOFFS heading reflects those funds which are due for the current month as well as the last month. The current and the next months payments are projected by the system and the cumulative amounts paid off are listed under the payoff heading.

Under the CLIENT SUMMARY RECORDS, the clients are listed by account number, ID number, and name. The control status words (CSW's) initial PARAMETERS, and pertinent DATES discussed above with respect to these client accounts are tabulated for each of the listed clients. For each of the client accounts, data in the BALANCE, PAYMENT, CREDIT, INVESTMENT, LOAN fields are summarized. Furthermore, the associated company data in the PROFIT, SPLIT, DEFICIT, and OPERATE fields, described above with respect to the client account formats, are summarized.

In the ACCOUNT SUMMARY field, the total number of clients having control status words (CSW's) with levels 1 and 4 flags set are listed for each of the control status words (A, P, L, I, C, S, D, O). Additionally, the total number of clients having selected $M_O$ dollar amount targets are listed for target amounts from, for example, $100,000 to $2,000,000. The total number of clients having various programs that start or finish during the current/last/next month or year are likewise listed. In this fashion, statistical data can be accumulated to identify the most often utilized target amounts and time periods as well as identifying the number of clients who are leaving and entering the program at a given time. The CLIENT ACCOUNT SUMMARY and COMPANY ACCOUNT SUMMARY, which are shown below the CLIENT ACCOUNT and COMPANY ACCOUNT SUMMARY records, are merely the summation of the fields in each of the headings shown. This summation data provides valuable information for the company executive into the total assets and liabilities for the company.

The final data stored in the investment account file are the MONTHLY INCREMENT and PERCENTAGE CHANGE data for the total clients in the system. The number of clients in each status are aggregated according to level 1 and 4 of the control status words (CSW's), and the total number of clients at each dollar amount target amount, and starting and finishing dates are further summarized. Finally, the overall monthly increment and percentage change data at the end of the file are tabulated for the entire system across each client account and company account summary field. Under each of these increment headings, the change in the account is calculated based on the current amount minus the previous month's amount and the percentage change is based on this difference divided by the last amount. This summation data provides valuable insight for the company executive into identifying important trends and patterns in month-to-month transitions.

Turning now to the flowcharts shown in FIGS. 11-15, FIG. 11 shows the PROCESS SERVICE REQUESTS routine which is depicted at block 212 in the software element subsystem diagram shown in FIG. 7. After the PROCESS SERVICE REQUESTS routine is entered (300), the client account number and account ID is read from the operator terminal 9 shown in FIG. 1. These account numbers and ID numbers are obtained by the operator from the client who is attempting to make a transaction (302). Thereafter, the client account file is retrieved from disk and the client ID number is retrieved from the ID file (304).

The client ID number is then compared with the retrieved file ID number (306). If the two ID's do not match, a message is written indicating that the ID is invalid (308), which is followed by a message indicating that the request has been denied (310) and the routine is exited.

If the check at block 306 indicates that the IDs match, then data defining the type of request the client is interested in making and the amount of the request are obtained from the input terminal (312).

Initially, a check is made at block 314 to determine whether the type of request is a check or credit card related request. If so, then a comparison is made of the amount requested and the funds in the client's credit available field. If the amount requested exceeds the amount available, as determined at 316, then a message is written that the request exceeds the available balance (318) followed by a request denied message (310) and the routine is exited.

If the check at block 316 indicates that the amount requested is less than or equal to the amount available, then the credit available is updated by subtracting the amount requested from the credit available and an authorization number is returned to the operator's terminal (320). Thereafter, a request granted message is generated and sent to the terminal and the transaction is entered in the transaction file (322), after which the routine is exited.

If the check at block 314 indicates that the type of request is not a check or credit card request, then a check is made at block 324 to determine whether the type of request is an investment request. If so, then a check is made to determine whether the amount requested is greater than the amount available for investments (326). If so, then the investment request is denied and appropriate messages are generated at blocks 318 and 310 and the routine is exited.

If the amount requested is not less than or equal to the amount available for investment, then the control status words indicating that an investment has been made are set. Thereafter, the available investment balance is updated and investment documents are sent to the client (328). The routine is exited after the request granted processing previously described at block 322.

If the check at block 324 indicates that an investment request has not been made, then a check is made at 330 to determine whether a loan request has been made. If a loan request has been made, then a check is made at block 332 to determine whether the credit available is greater than zero. If so, then a message is generated to indicate that credit is available and the client is advised to write a check to fund the transaction (342) and the routine branches back to block 312 to process the client's check. Thus, in the exemplary embodiment, by virtue of the determination at 332, the applicant is precluded from seeking a loan if he has a balance in his checking account.

If the check at block 332 reveals that the credit available balance is less than or equal to zero, then a check is made to determine whether the amount of the loan request is greater than the amount which the client is authorized to borrow. If so, then the loan request is denied and the routine is exited via blocks 318 and 310.

If the amount of the loan request is less than or equal to the amount available to be loaned, then a check is made at block 336 to compare the loan limit with the loan available to determine whether there are any outstanding loans If so, then at block 340 the existing loans are updated as per the formula shown in block 340. After updating existing loans at block 340, or if the check at block 336 yields a negative response, the loan available balance is updated by subtracting the amount of the loan requested. Additionally, appropriate loan control status words are set. Thereafter, request granted processing takes place at block 322 after which the routine is exited.

If the check at block 330 reveals that a loan request has not been made, then a check is made at block 344 to determine whether a trial balance has been requested. If so, a trial balance is calculated as per block 348 to find a new target amount $M_1$ or a new target date $N_1$ based on increased monthly payments $Y_1$ and/or an increased cash deposit $X_1$ (the actual processing algorithms to find $M_1/N_1$ are shown and described at block 496 in FIG. 9).

If the check at block 344 reveals that a new trial balance has not been requested, then a message is written to inform the operator that the current inquiry is an invalid request (346) and the routine branches back to 312 to read further requests from the terminal.

Turning now to the UPDATE CLIENT FILES routine, the functions performed by this routine are generically shown in FIGS. 3A and 3B. The routine serves to calculate all the values for the variable fields shown in the format for the client account file described above in conjunction with FIGS. 6A and 6B.

Initially, variables are retrieved and updated which affect much of the subsequent processing done in the routine. In this regard, after the UPDATE CLIENT FILES routine is entered (400), the current growth rate percentage is retrieved from the bank input (402). Thereafter, a variable $I_{RATE}$ is determined by dividing the growth rate percentage minus 8% by 12 to determine the monthly rate. Additionally, a reference constant reflecting the 8% minimum rate of return is stored which is equal to 1.067 as shown in FIG. 12A. The client file year-to-date minimum and maximum interest rate or growth rate figures are also updated. Additionally, the transaction file is sorted by client account number to organize monthly transactions made for investments, loans, checks, etc. The update client file routine loop is then initialized for each successive client to be processed. Using "X" to represent any given client, the client account file for the next given client X is retrieved and all transactions for client X are retrieved (404). Thereafter, the header data for the client account file is printed out including the data relating to the report, client, status, and other parameters, as shown at block 406.

The account growth processing phase of the UPDATE CLIENT FILES routine loop is then entered. In block 408 an initial calculation is made of a preliminary balance (BAL) which is a balance incremented by the 8% minimum growth rate (which is equal to 1.067 times the prior balance). Thereafter, the balance at 8% (which is the minimum guaranteed account balance) is set equal to 1.067 times the previous 8% balance to serve as a reference as to how much greater the actual balance (BAL) is at any given time over the course of the program. Additionally, loan limit and loan available updating calculations are made at block 408. It is noted that the loan limit is tied to the 8% balance by way of example only.

Thereafter, as determined by the check at block 410, a determination is made whether the current growth rate is greater than 8% which indicates that the system is in the profit making zone and is not running at a deficit. If the growth rate does exceed the minimum 8% rate, then as determined at block 412 the limits associated with the clients account are expanded by the current growth rate. The variable shown in block 412 are those variables which are affected by the current growth rate. The percentage of the excess funds which are utilized to expand these variables are arbitrary values that may be set to any desired percentage. Thus, for example, the credit available to a client may be expanded beyond the current credit available plus ¼ of the excess over the 8% minimum guaranteed rate of return. Note that the DEFICIT variable is appropriately set to zero.

If the growth rate, however, is below the 8% minimum, then control status switches are set to indicate that a deficit condition exists and that there is no split of profits between the company and the client. Thereafter, the deficit amount is calculated (414) and stored in the DEFICIT variable for subsequent processing herein. After the processing in either block 412 or 414, the growth changes or "deltas" set forth in the client account format in FIG. 9B are printed.

The deposit and withdrawal processing phase of the routine is next entered. In this regard, a check is made at 418 to determine whether a client deposit has been made. If so, the client deposit is added to the payment received field (420). A check is then made at block 422 to determine whether the payment received is greater than or equal to the payment required. If the payment received is not greater than or equal to the payment required, then a control status word flag is set indicating this condition and the client is sent an insufficient notice and the routine sequences to block 428. If the payment received is greater than or equal to the payment required, then the payment control status word is reset (424) and the routine advances to block 428.

A check is then made at block 428 to determine whether the company has made a deposit. If the company has presented a deposit, then the company deposit will be added to the company profit field in the client account file (430). A check is then made at block 432 to determine whether the profit field in the client account file is greater than or equal to the pending deficit. If not, the appropriate control status word is set and the company is sent a warning notice indicating that further funds are required (436) and the routine advances to block 438. If, however, the company profit is greater than or equal to the pending deficit, then the deficit control status word is reset (434) and routine advances to block 438.

A check is next made to determine whether the client account has any bank debits associated with it (438). If so, then the client has utilized his checking account or credit account privileges and a new credit available balance is determined by subtracting the new checks and/or purchases (440). Thereafter, a test is made to determine whether the client's credit available is greater than zero (442). If not, the appropriate flag in the credit control status word is set and the bank is sent a credit cut-off notice with respect to client X (444) and the routine sequences to block 446. If the client's available credit is greater than or equal to zero (as determined at 442) or if the check at 438 indicates that there are no bank debits associated with the account, a printout is generated of all current deposits and withdrawals in the client's account (446).

Thereafter, the monthly processing portion of the routine is entered. Initially, the required monthly payments is set equal to $Y_O$, the agreed-upon monthly payment (448). A check is then made at block 450 to determine whether the client's investment limit is greater than his investment available funds. If so, the investment payment required is set equal to the amount of the investment divided by 24 (452). It should, of course, be recognized that how fast client investments are paid off or whether they are required to be paid off at all may be modified from the requirements set forth in the exemplary embodiment.

Thereafter, a check is made to determine whether there are any outstanding loans by determining whether the client's loan limit is greater than his loan available funds (454). If so, then the loan payment is set to be equal to the amount of the outstanding loan divided by 12 (456). Thus in the present exemplary embodiment loans are required to be repaid within 12 months.

If the check at block 454 indicates that the loan limit is not greater than the loan available or after processing at 456, the routine advances to block 458 wherein cumulative account costs are calculated. The pending operating costs are then determined by adding the pending operating costs plus the current operating costs plus life insurance and other account operating expenses. After the pending operating costs are calculated, a global variable labeled "AMOUNT" is set equal to the required operating costs which is, in turn, equal to the pending operating cost. The DEFAULT subroutine (described later with respect to FIG. 14) is then called (458) with AMOUNT as one of the parameters being passed.

When the DEFAULT subroutine is called from block 458, the prefix "0" for operating costs is assigned to the variables processed by the subroutine. In this regard, it is noted that the DEFAULT subroutine shown and described with FIG. 14 is a generalized processing routine that assigns the pertinent prefix (P/C/I/L/D/O) to the calling routine's array variables which are being modified, decremented, or switched (e.g., CSW, avail, default, pend, paid, etc.). Thus, when called from block 458 the DEFAULT subroutine calculates the operating costs that must be subtracted from the company's funds.

A check is next made at block 460 to determine whether the deficit control status word has been set. If the check at block 460 determines that the deficit flag DCSW1 is on, the routine establishes a cumulative account deficit (462). In this regard, the pending deficit is set equal to the old pending deficit minus the new deficit (which is a negative number) to yield a larger deficit. Thereafter, the global variable "AMOUNT" is set equal to the deficit payment required which is, in turn, equal to the deficit pending. The DEFAULT subroutine is called (460) with AMOUNT as a passed parameter. As described above, the prefix D (for deficit) is now assigned to the local variables processed by the DEFAULT subroutine.

Figure 14A:
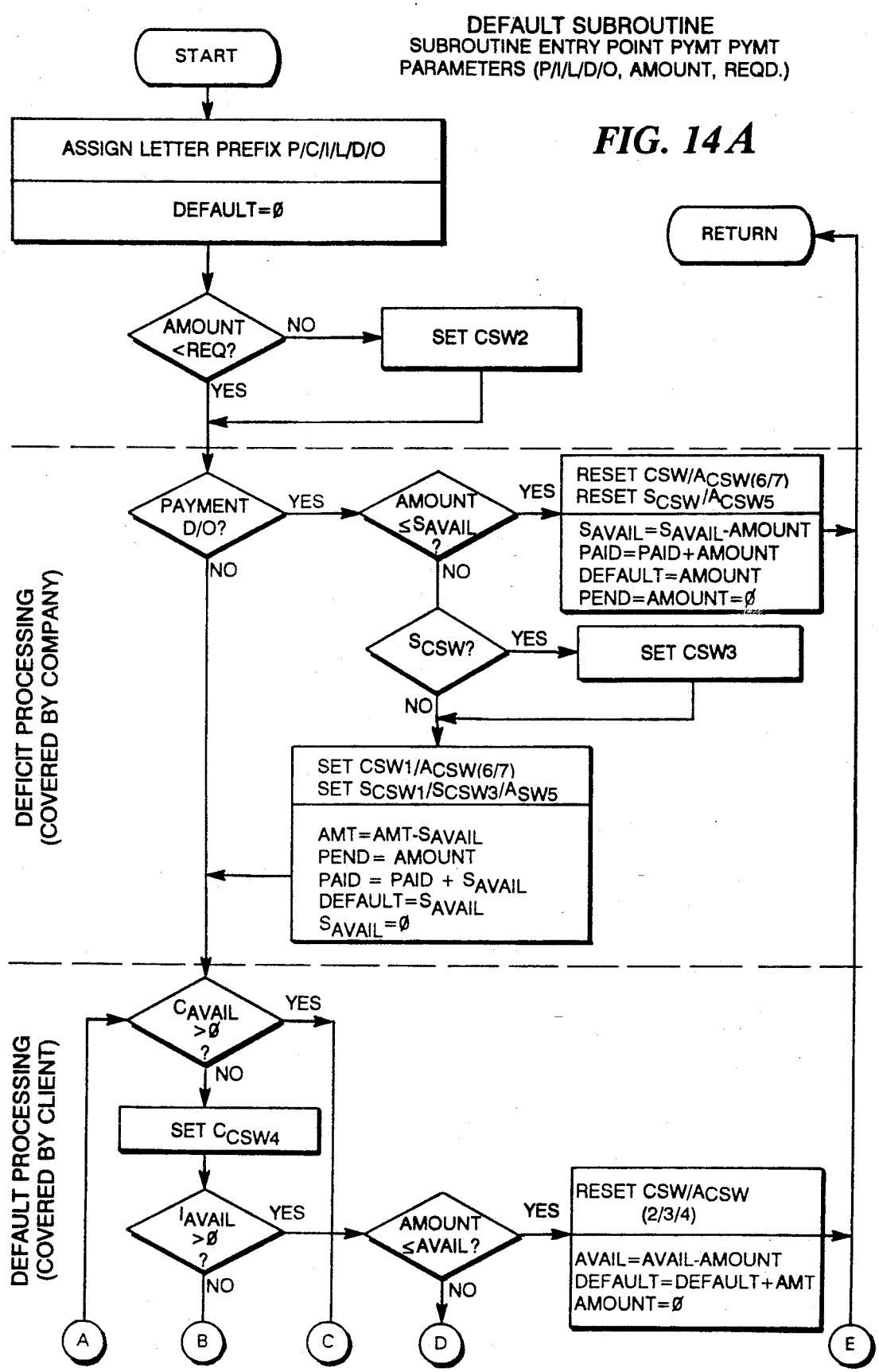
FIGS. 14A and 14B are flowcharts delineating the sequence of operations performed by the default subroutine.
Figure 14B:
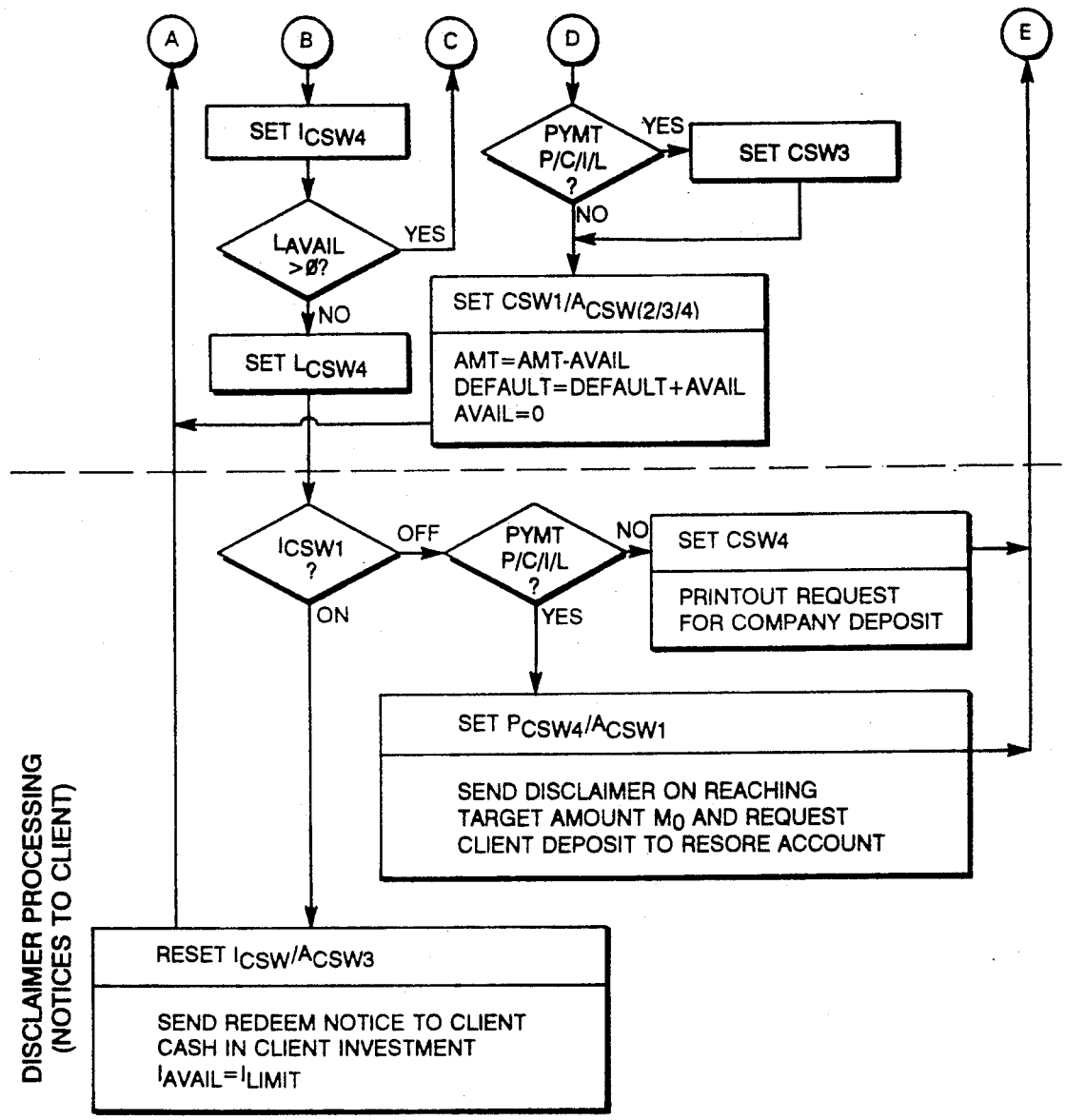

Upon entry into the DEFAULT subroutine, which is shown in FIG. 14A and 14B, a letter prefix is assigned to all variables processed in the subroutine. As noted above, if the routine is entered from block 458, then all the variables are associated with the operating prefix "O". Alternatively, if the subroutine is called from block 462, then all variables are associated with the deficit prefix "D". Furthermore, the local variable "DEFAULT" is initialized to 0.

The DEFAULT subroutine serves to determine the amount of funds required to cover default payment or deficit and to set or reset the associated control status words. The routine also determines the hierarchy of subaccounts from which such funds are to be extracted. The deficit processing section of the default subroutine represents funds covered by the company. The default processing section of subroutine represents funds that must be covered by the client.

The DEFAULT subroutine receives as inputs, the payment AMOUNT supplied by the client or company and the payment REQUIRED to have been made. If the amount paid is less than the amount required, as noted above, the subroutine then determines how to cover the deficit or default.

In the exemplary embodiment shown in shown in FIG. 14, if the payment required relates to a company deficit or a company operating expense, then the payment is covered by the amount of funds in the company's split of profits (i.e., from $S_{avail}$).

If the payment required does not relate to a company account deficit or operating expense or if the company's available funds are exhausted, then in the present exemplary embodiment, the funds are extracted first from the client's credit available balance. If no funds are available in the client credit available balance, then the funds are extracted from the clients available investment balance.

If the investment funds are exhausted, then the company will extend a loan to the client to cover defaults attributed to the client. If the loan available funds are also exhausted, then the routine enters a disclaimer processing mode. In this mode, a client may be sent, for example, a notice indicating that the desired target amount M cannot be reached unless the client sends in a deposit to restore the account to the required level.

It is noted that in the default processing routine, if the client neglects to make the agreed-upon monthly payment, the monthly payment is extracted from the client's available credit, then from the invested funds, and thereafter sequences to a loan mode to cover the required monthly payment. Thus, the default processing subroutine serves to insure that the client's account is kept on track such that the minimum 8% return is sustained by the company, and such that the target goal M, is achieved by the client by the end of the prescribed timeframe (year N). This subroutine presents one exemplary approach to covering company and/or client payment problems which may ultimately result, as a worst case scenario, in the disclaimer processing cited.

After default processing, the DEFAULT subroutine then returns control to the calling UPDATE CLIENT FILES routine at block 464. After printing out the payments required for the current month (464), the routine then checks the clients transaction file to determine whether a monthly payment was made. If the monthly payment was made, the variable "AMOUNT" is set equal to that payment as per block 466.

Figure 13:
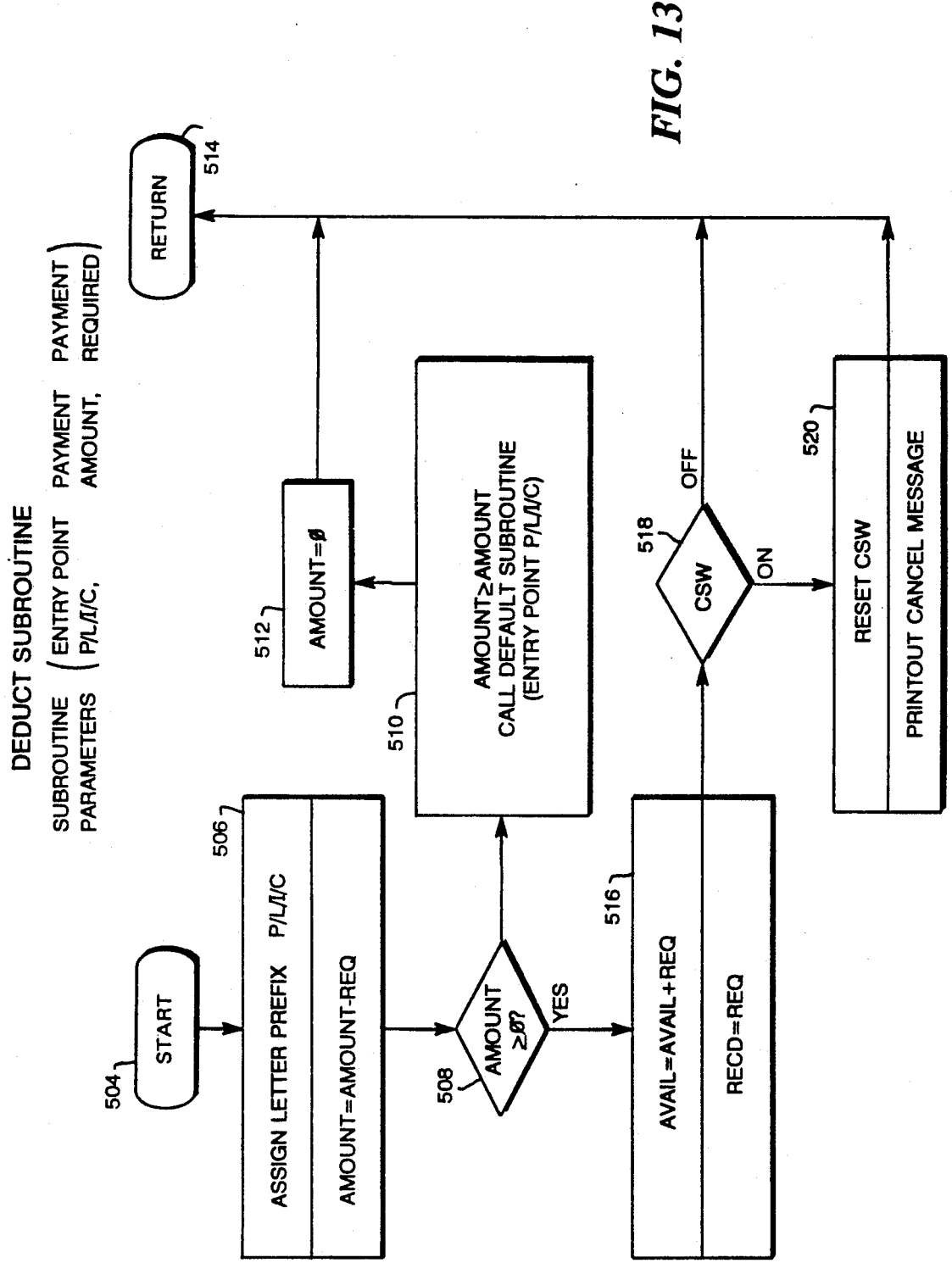
FIG. 13 is a flowchart delineating the sequence of operations performed by the deduct subroutine.

A check is then made at block 468 to determine whether a monthly payment is required for the current month. If a payment is required, then a variable "REQUIRED" is set equal to the client's monthly payment ($Y_O$). Thereafter, a DEDUCT subroutine, which is shown and described in FIG. 13 is called. Turning briefly to the DEDUCT subroutine, the subroutine is entered at block 504. Just as with the DEFAULT subroutine described above, a unique letter prefix is assigned to all local variables, depending on the name of the calling routine from which the subroutine is called. For example, if the subroutine is called from block 470, then all variables are assigned the payment prefix "P".

After assigning the appropriate letter prefix in block 506, the amount required to be paid is subtracted from the payment actually made and the result is stored in the global variable "AMOUNT". Thereafter, AMOUNT is checked to see if it has a value greater than or equal to zero (508). If the amount is at least equal to zero, indicating that the right amount has been paid, then the available and received variables are updated (516). Thereafter, a check is made of the CSW associated with the assigned prefix (518). If the CSW is on, then that CSW is reset and a message is sent to the operator (520) indicating that the associated CSW flag has been "cancelled" or fully reset. The subroutine then returns to the main calling routine as per block 514.

If the check at 508 reveals that the amount of the required payment minus the client's actual payment was less than zero, then the variable "AMOUNT" has its sign changed and the DEFAULT subroutine is called and entered at the appropriate point P, L, I, or C (510), for processing a default payment, as discussed above. Thereafter, AMOUNT is reset to zero (512) and the subroutine returns to the main calling routine (514).

Turning back to FIG. 12, after the execution of the DEDUCT subroutine which subtracts the required monthly payment from the amount paid, or if no monthly payment was required at block 468, then the variable "LOAN" is set equal to the loan available which is the current loan available value minus last month's loan available value (472), in order to provide for subsequent printing of this amount.

Thereafter, a check is made to determine whether a loan repayment is required for the current month (474). If so, the variable "REQUIRED" is set equal to $L_{REQ}$ and the DEDUCT subroutine is called wherein the letter prefix "L" is assigned to variables processed by the subroutine (476) as explained above. After the processing at block 476, or if no loan repayment was required at block 474, then the variable "INVEST" is set equal to the variable $I_{avail}$ which is the current investment amount available minus last month's amount available (478).

Thereafter, a test is made at block 480 to determine whether a repayment is required of the client to cover his or her investments. If so, the variable "REQUIRED" is set equal to $I_{required}$, and the variable "AMOUNT" is updated to take into account any dividend which may have been paid on the investment. The DEDUCT subroutine is then called at entry point "I" to subtract the payment required from the amount (482), as described above.

After the processing at block 482 or if no investment repayment was required at block 480, a check is made to determine whether the variable "AMOUNT" is still greater than zero (484). If so, the client has made a payment in excess of all the required payments. Such an excess payment is referred to as an "accent payment" and is credited to the client to raise his credit line (486). To do this, the DEDUCT subroutine is called at entry point "C" to update the client's available credit (486), as described above.

After the processing at block 486, or if the check at block 484 reveals that there is nothing left over, the variables "PAYMENTS RECEIVED" and "DEFAULT PAYMENTS" are printed out (488). Thereafter, total default amounts are calculated as the $C_{DEBIT}$ for the client and $S_{DEBIT}$ for the company (490), followed by total amounts for INVEST and LOAN, if applicable. All of these account debits are then printed out if any exist (490).

After printing out the account debits, the routine sequences to the account balances processing, beginning at block 492 of FIG. 12. This account balances processing calculates the values for the account thresholds, projections, and balances shown at the end of the client's account file.

Initially, the overall company profit (PROFIT) and client balance (BAL) for the current month are calculated using the equations shown in block 492. Thereafter, the threshold values are calculated for the target amount M at the growth rates of 6%, 8%, 10%, and the current growth rate, GR%. These thresholds are determined based on the equations shown at block 494 and as previously described in the specification. It is noted that the month index "j" is initialized to the current month so that the resulting future balance is appropriately projected from the current month's balance. Hence, the balance for the current month $BAL_j$ must include the previous month's balance plus the current month's monthly payment ($Y_\phi$).

Thereafter, at block 496, projections are calculated for an increased target amount $M_1$ and/or reduced number of years $N_1$ based on a trial deposit increment of $X_1$ and/or a trial payment increment $Y_1$. If the trial deposit increment and/or trial payment increment are not selected by the client, then by way of example, the system defaults to a predetermined trial deposit and trial monthly payment to stimulate client interest, as shown at the bottom of block 496. The equation shown at block 496 is similar to the equation shown at block 494 except that the balances are supplemented by the trial deposit $X_1$ and/or an increased payment increment $Y_1$.

After the processing at block 496, the projected company split of profits up to year $N_o$ is determined (498). Thereafter, the updated balances for client default, client split, company profit, and client BAL fields are printed out, thereby completing all calculations required to update the file for client X (500). The routine then returns to loop init processing at entry point A in FIG. 12 to store back on disk 3 the updated account file for client X.

A check is then made to determine whether the routine has reached the end of the client account file (506) and, if so, the routine is exited (508). If not, the account file for the next client is retrieved (404) and the UPDATE CLIENT FILES routine continues processing until all client files have been processed.

Figure 15A:
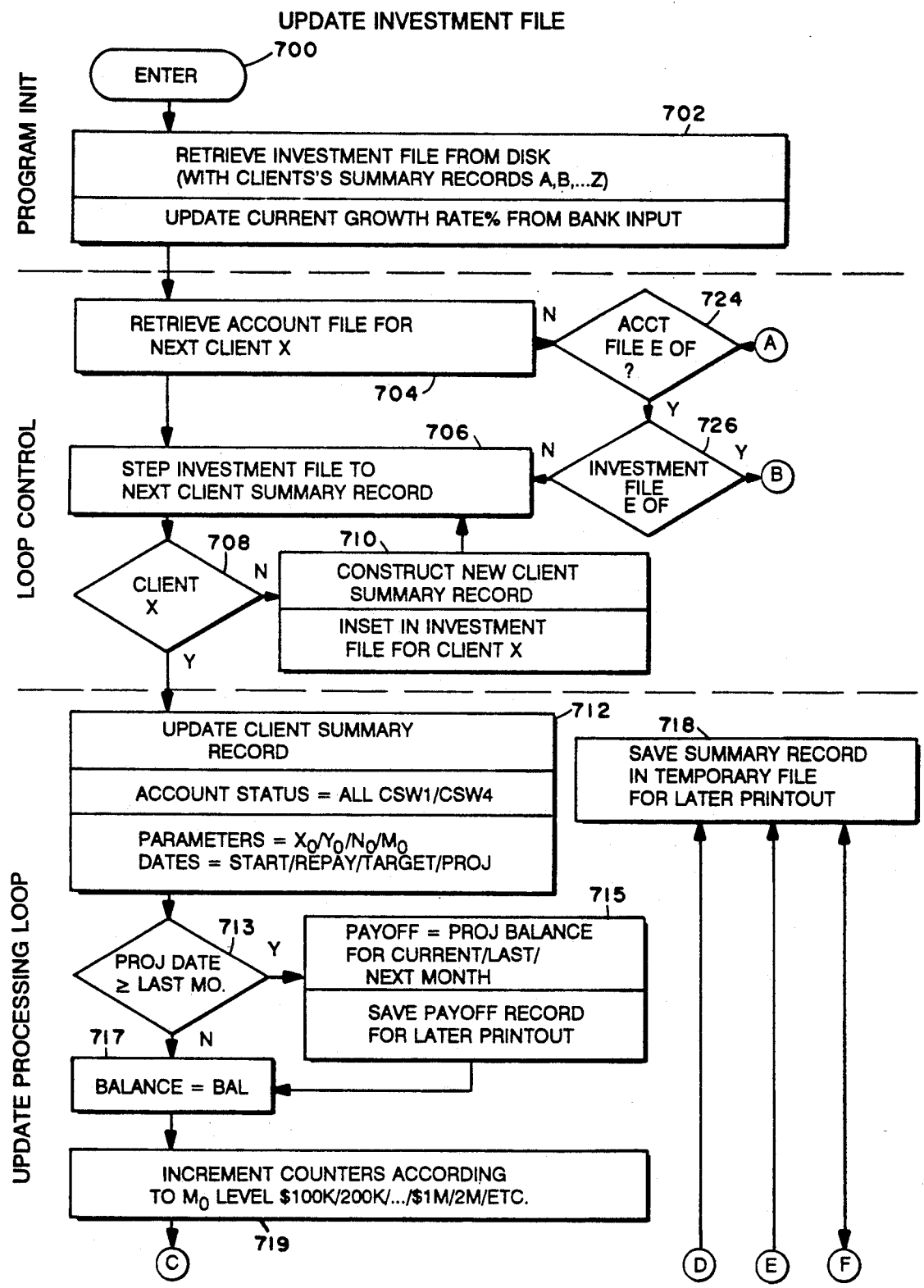
FIGS. 15A and 15B are flowcharts delineating the sequence of operations performed by the update investment file routine.
Figure 15B:
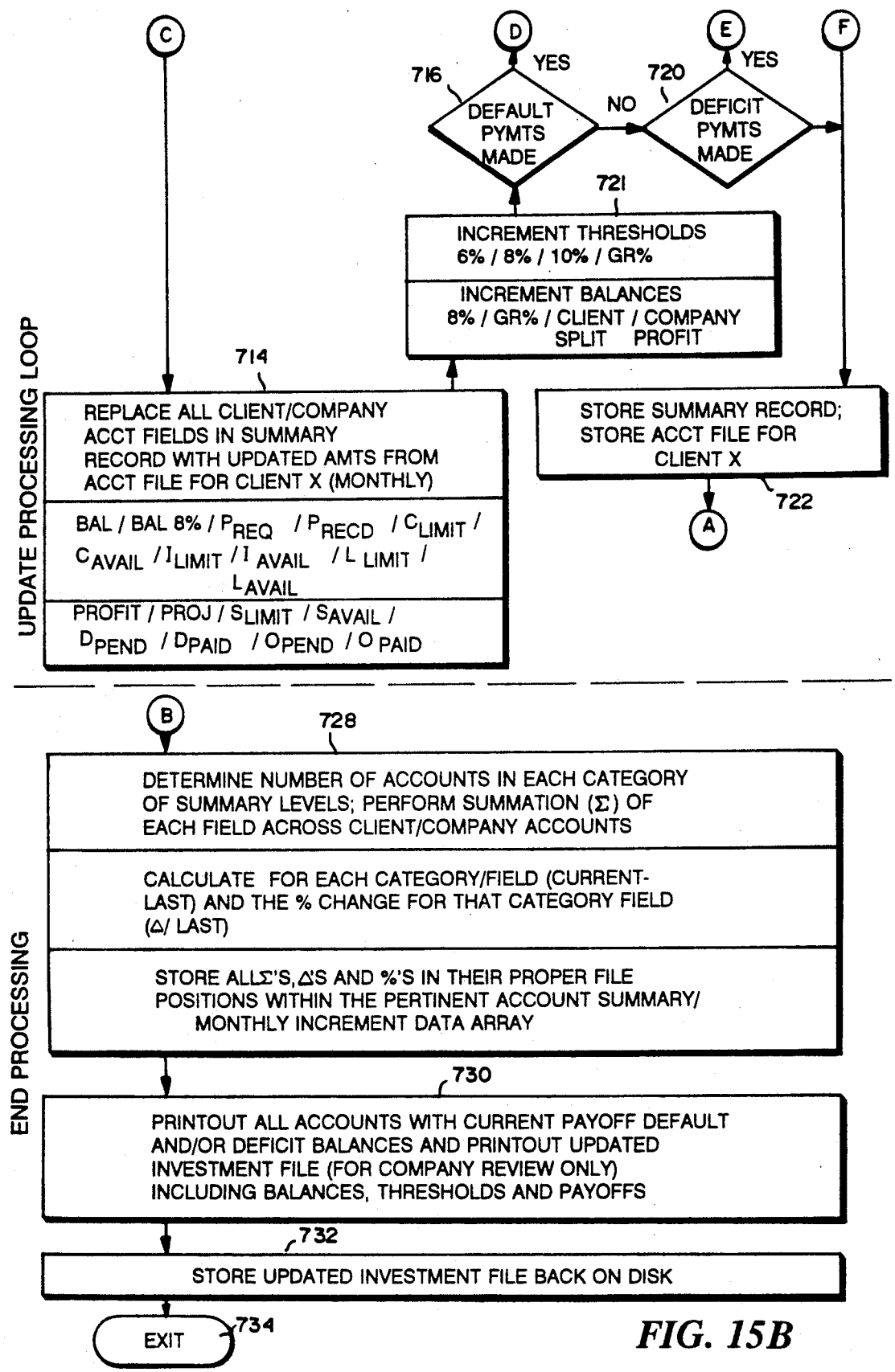

Turning now to the UPDATE INVESTMENT FILE routine shown in FIGS. 15A and 15B, after entering (700), the investment file is first retrieved from disk 3 (702). The current growth rate, GR%, is initially updated based on bank input (702). The investment file includes summary records for each client, as described in detail in conjunction with the investment file format of FIG. 10. To update all the required investment file information, the routine retrieves the client account file for each successive next client X (704) and steps the previously-retrieved investment file to the client summary record for client X (706).

A check is then made to determine if client X has his own summary record (708). If client X does not have a summary record, then this indicates that the client is new to the system, so that a new client summary record must be constructed and inserted into the investment file client summary record field (710). After constructing the new record for client X, the system is then advanced to this record by virtue of block 706.

If the check at block 708 indicates that there is a summary record for client X, then the routine will advance to the update client summary record loop (712). In block 712, the account's status is set to show all CSW's whose first level and/or fourth level are ON. The first level reflects the number of accounts with a "flag" and the fourth level, those with a serious "flagged" condition. Additionally, the basic parameters described above $X_O$, $Y_O$, $N_O$, and $M_O$ are set for the client record being updated and the pertinent account dates are updated (712).

A check is made at block 713 to determine whether the projected date for achieving the target goal is greater than or equal to last month. If so, then the client's payoff figure is calculated at block 715. After the processing at block 715, or if the projected date is less than last month, the BALANCE field is set equal to BAL (717). Thereafter, the counters are incremented to keep track of the number of clients having target amounts $M_o$ at incremental levels ranging from $100K to $2M (719).

Figure 10B:
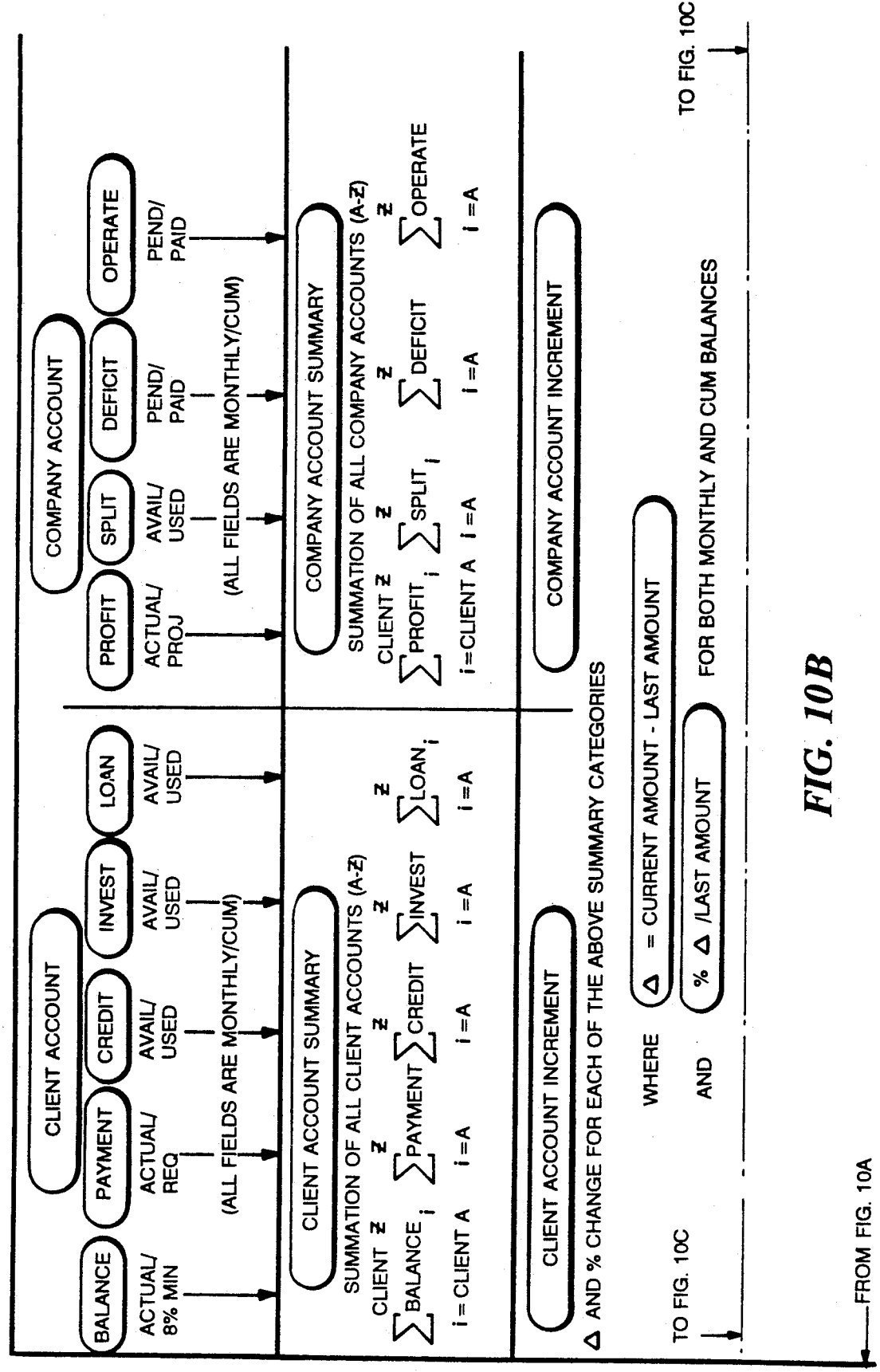
Figure 10C:
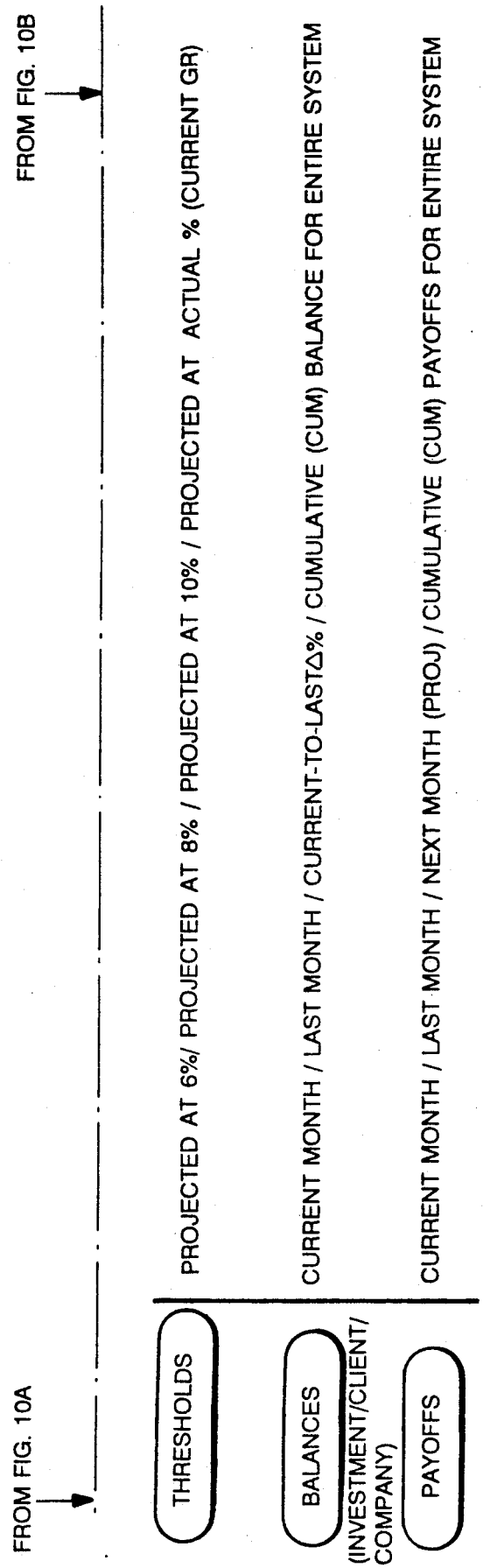

With the current status of such variables updated, the routine then replaces all client and company account fields in the summary record with updated amounts retrieved from the individual client account file previously discussed with respect to FIG. 10. The specific account fields which are updated are listed in block 714.

Thereafter, all thresholds and balances for the entire system are incremented at block 721. A check is then made at block 716 to determine whether client X has made default payments. If so, then a record is kept of that client's summary record in a temporary file for later printout (718). If no default payment has been made, then a check is made to determine whether deficit payments have been made out of the account (720). If the account has made deficit payments, then a record of such is also stored in the temporary file (718). Thereafter, the summary record for client X is stored back on disk 3 (722) and the client account file for the next client is retrieved (704), if the account file has not reached the end of file (724). If the client account file is at the end of file, then another check is made to determine whether the summary records for all clients (A , . . . , Z) have been processed (726).

After all client files have been processed, an end processing routine is entered (728). In the end processing, the total account summary information is determined. In this regard, the number of accounts which fall into each category shown in the account summaries are tabulated. A summation of each field across the client and company account headings is performed. Thereafter, the net change or "delta" in each of the categories and fields are calculated by taking the current month's amount and subtracting last month's amount. This permits the percentage change to be likewise calculated for each category or field. All the summations, deltas and percentage changes thus calculated are then stored in their proper file positions within the pertinent account summary and monthly increment arrays, as described earlier with respect to FIG. 8. Thereafter, as indicated at block 730, all accounts are printed out with current payoff, default, and/or deficit balances for company review. This data may be used to determine what action, if any, must be taken for such accounts on behalf of the entire system. Thereafter, the complete, updated investment file is printed out for the company's review, complete with aggregate balances, thresholds, and payoffs. The updated investment file is thereafter stored on disk (732) and the routine is exited at block 734.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An investment tracking data processing system comprising:
    data entry means for entering investment related data including a target amount for each of a plurality of client accounts;
    memory means for storing instructions and for storing data in a plurality of client account files; and
    control means, coupled to said memory means and said data entry means, for executing said instructions and for processing said data, said control means including means for associating said data with a corresponding one of said plurality of client account files, for updating cumulative investment base data in each of said plurality of client account files, means for segregating each of said plurality of client account files into a plurality of account fund files, and
    means for projecting, based upon said investment related data, the amount of time required, for said cumulative investment base to reach said target amount.

2. An investment tracking data processing system according to claim 1, wherein said data entry means includes means for entering initial investment base related data associated with said accounts, said control means including means for updating said investment related data in each of said plurality of account funds files as a function of account growth in excess of a predetermined rate of return.

3. An investment tracking data processing system according to claim 2, wherein said means for updating said investment base related data is further responsive to prevailing rate of return data.

4. An investment tracking data processing system according to claim 2, further including means for storing indicia in said account files related to achievement of said predetermined rate of return on the initial investment base.

5. An investment tracking data processing system according to claim 1, wherein said data entry means includes means for entering target amount data, initial investment base data, and monthly payment data, said means for projecting being responsive to said entered data for determining the number of years required to reach said target amount presuming account growth at least at the prevailing rate of return.

6. An investment tracking data processing system according to claim 1, wherein said control means includes means for monitoring client account investment base fluctuations over time and for periodically determining the current client account progress towards achieving said target amount.

7. An investment tracking data processing system according to claim 6, further including means for storing in at least one of said client account files indicia responsive to prevailing interest rates and financial service usage for determining the amount of funds by which a client investment base is to be modified based on such service usage and prevailing interest rates; and means for determining in response to such service usage and prevailing interest rates, the amount of funds to be targeted or withdrawn from at least one associated separate account, whereby the balance in at least one associated company account is varied depending upon client account performance.

8. An investment tracking data processing system according to claim 6, wherein said client account investment base fluctuations are due to at least one of prevailing interest rates and use of financial services;
said control means including means for selectively approving financial service use; and
means responsive to said means for selectively approving for decrementing said client cumulative investment base data.

9. An investment tracking data processing system according to claim 8, wherein said means for selectively approving includes means for verifying the clients' identification.

10. An investment tracking data processing system according to claim 8, wherein said means for selectively approving includes means for analyzing the service request by comparing a predetermined portion of the clients' account balance with the amount of funds associated with said services request.

11. An investment tracking data processing system according to claim 10, wherein said service request is at lest one of a loan request, an investment request, a check or credit card honoring request.

12. An investment tracking data processing system according to claim 1, further including means for monitoring the updated investment base related data associated with at least one of said client account files and for comparing said data with predetermined growth rate threshold related indicia.

13. An investment tracking data processing system according to claim 12, further including means responsive to said comparison for updating and modifying the account investment base indicia.

14. An investment tracking data processing system according to claim 1, wherein said data entry means includes a keyboard and a display means, whereby an operator enters investment related data received via a telephone line.

15. An investment tracking data processing system according to claim 1, wherein each of said client account files include means for storing limits associated with loan, checking and insurance privileges of said accounts.

16. An investment tracking data processing system according to claim 1, wherein said data processing system further includes at least one modem and said data entry means includes terminal means connected to said memory means via said at least one modem.

17. An investment tracking data processing system according to claim 16, further including a plurality of auxiliary processor means, each of said plurality of auxiliary processor means being coupled to said memory means, for handling service processing tasks assigned by said control means.

18. An investment tracking data processing system according to claim 17, wherein one of said plurality of auxiliary processor means is coupled to at least one modem and is dedicated to handling input-output processing tasks.

19. An investment tracking data processing system according to claim 1 wherein said control means further includes control status word means including at least one control status word having a plurality of bit positions, each bit position being indicative of a predetermined account related status condition, said control means including means for controlling the program execution sequence depending upon the state of said at least one control status word.

20. An investment tracking data processing system according to claim 19, wherein said means for updating said entered data includes means for setting bit positions in said at least one control status word.

21. An investment tracking data processing system according to claim 19, wherein said at least one control status word reflects the rate of growth of a client investment base.

22. An investment tracking data processing system according to claim 19, wherein each of said client account files includes means for storing data reflecting the amount of funds available for financial services, and wherein each client file further includes means for storing the active control states of said at least one control status word.

23. An investment tracking data processing system according to claim 19, wherein said data entry means includes an associated means for displaying, and wherein said control means including means for controlling the display to display the control states of said at least one control status word.

24. An investment tracking data processing system according to claim 19, wherein said at least one control status word includes means indicative of an error condition.

25. An investment tracking data processing system according to claim 1, wherein said means for segregating includes means for dividing initially received investment data into at least two separate account fund files, wherein one of said account fund files is dedicated to achieving said target amount.

26. An investment tracking data processing system according to claim 1, further including a plurality of data arrays for storing investment related data, including a current month data array and a previous month data array, said control means further including updating means for shifting data from the current month data array to the previous month data array and for thereafter loading data relating to the current month into the current month data array.

27. An investment track data processing system according to claim 1, further including means for retrieving form said memory means a plurality of said client account files; and
means, responsive to said means for retrieving, for storing in a separate file in said memory means cumulative investment related data from each of said client account files.

28. A method of operating an investment tracking data processing system having a data entry means for entering investment related data, memory means for storing said data and processing means coupled to said data entry means and said memory means for processing said investment data, said method comprising the steps of:
entering investment related data including a target amount via said data entry means;
associating said entered investment data with a corresponding one of a plurality of client account files;

segregating each of said client account file into a plurality of account fund files;

updating said plurality of client account files to maintain cumulative investment base data for each of said client account files; and projecting, via said processing means, based upon said investment related data the amount of time required for said cumulative investment base to reach said target amount.

29. A method according to claim 28, further including the steps of:

entering initial investment base related data associated with said accounts; and updating said investment base related data in each of said plurality of account fund files as a function of account growth in excess of a predetermined rate of return.

30. A method according to claim 29, wherein the step of updating said investment data is further responsive to prevailing rate of return data.

31. A method according to claim 29, further including the step of storing in said account files indicia related to achievement of said predetermined return on the initial investment base.

32. A method according to claim 29, further including the steps of:

monitoring client account investment base fluctuations over time; and periodically determining the current client account progress towards achieving said target amount.

33. A method according to claim 32, further including the steps of:

storing in at least one of said client account files indicia responsive to prevailing interest rates and financial service usage;

determining the amount of funds by which the client investment base is to be modified based on said interest rates and financial service usage; and determining, in response to both service usage and prevailing interest rates, the amount of funds to be deposited or withdrawn from at least one separate account, whereby an associated company account balance is varied depending upon client account performance.

34. A method according to claim 29, further including the steps of:

monitoring the updated investment base related data associated with at least one of said client account files; and comparing said data with predetermined growth rate threshold related indicia.

35. A method according to claim 34, further including the step of updating the account investment base indicia in response to said comparing step.

36. A method according to claim 28, wherein said entering step includes entering initial investment base data and monthly payment data, and wherein said projecting step includes the step of determining the number of years required to reach the target amount presuming account growth at least at a predetermined rate of return.

37. A method according to claim 28, further including the steps of monitoring client investment base fluctuations due to at least one of prevailing interest rates and use of financial services, and selectively approving financial service use in response to said monitoring step; and decrementing said client cumulative investment base if financial service use is approved.

38. A method according to claim 37, wherein said step of selectively approving includes the step of analyzing the service request by comparing a predetermined portion of the client's account balance with the amount of funds associated with said services request.

39. A method according to claim 28 further including the step of monitoring client account fluctuations due to at least one of a load request, an investment request, a check or credit card honoring request.

40. A method according to claim 28, wherein said processing means includes control status word means including at least one control status word having a plurality of bit positions, each bit position being indicative of a predetermined related status condition, wherein said method further includes the step of controlling at least one instruction sequence executed by the processing means depending upon the state of said at least one control status word. state of said at least one control status word.

41. A method according to claim 40, wherein said step of updating said plurality of account files includes the step of setting bit positions in said at least one control status word.

42. A method according to claim 40, wherein said at least one control status word reflects the rate of growth of a client investment base.

43. A method according to claim 40, including the steps of storing data reflecting the amount of funds available for financial services in each of said client account files and storing the active control states of said at least one control status word in each of said client account files.

44. A method according to claim 40, wherein said data entry means includes an associated means for displaying, said method further including controlling the display to display the control states of said at least one control status word.

45. A method according to claim 44, further including the step of dedicating at least one control status word to be indicative of an error condition.

46. A method according to claim 28, further including a plurality of data arrays for storing investment related data, including a current month data array and a previous month data array, said method including the steps of shifting data from the current month data array to a previous month data array and thereafter loading data relating to the current month into the current month data array.

47. A method according to claim 28, further indicating the steps of:

retrieving from said memory means a plurality of said client account files; and storing in a separate file in said memory means cumulative investment related data from each of said retrieved client account files.

48. A method according to claim 28, wherein said step of segregating includes the step of dividing initially received investment data into at least two separate account fund files; and utilizing one of said account fund files to achieving said target amount.

* * * * *